United States Patent
Cai et al.

(10) Patent No.: US 8,571,488 B2
(45) Date of Patent: Oct. 29, 2013

(54) POWER CONTROL FOR CLOSED LOOP TRANSMIT DIVERSITY AND MIMO IN UPLINK

(75) Inventors: Lujing Cai, Morganville, NJ (US); Benoit Pelletier, Quebec (CA); Hong O. Zhang, Manalapan, NJ (US); Fengjun Xi, Huntington Station, NY (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 154 days.

(21) Appl. No.: 13/082,725

(22) Filed: Apr. 8, 2011

(65) Prior Publication Data

US 2011/0263281 A1 Oct. 27, 2011

Related U.S. Application Data

(60) Provisional application No. 61/322,448, filed on Apr. 9, 2010, provisional application No. 61/330,153, filed on Apr. 30, 2010, provisional application No. 61/410,682, filed on Nov. 5, 2010, provisional application No. 61/431,237, filed on Jan. 10, 2011.

(51) Int. Cl.
*H04B 1/00* (2006.01)
(52) U.S. Cl.
USPC ............................................. 455/69; 455/101
(58) Field of Classification Search
USPC ..................... 455/101, 69, 1, 456.6
See application file for complete search history.

(56) References Cited

U.S. PATENT DOCUMENTS 7,945,222 B2 * 5/2011 Harel et al. .................... 455/101
2008/0080634 A1 4/2008 Kotecha et al.

2010/0255790 A1 * 10/2010 Farajidana et al. ............. 455/69
2010/0266063 A1 10/2010 Harel et al.
2010/0272034 A1 * 10/2010 Imai et al. ..................... 370/329

FOREIGN PATENT DOCUMENTS

| WO | WO 2008/058143 A2 | 5/2008 |
|----|-------------------|--------|
| WO | WO 2010/117981 A2 | 10/2010 |
| WO | WO 2011/041719 A2 | 4/2011 |

OTHER PUBLICATIONS

3rd Generation Partnership Project (3GPP), R1-102812, "PHICH collision handling for carrier aggregation", Intel Corporation (UK) Ltd, 3GPP TSG-RAN WG1 #61, Montreal, Canada, May 10-14, 2010, 4 pages.
3rd Generation Partnership Project (3GPP), Ts 25.133, V9.0.0, "3rd Generation Partnership Project; Technical Specification Group Radio Access Network; Requirements for support of radio resource management (FDD) (Release 9)", May 2009, 225 pages.

(Continued)

*Primary Examiner* — Tu X Nguyen
(74) *Attorney, Agent, or Firm* — Condo Roccia LLP

(57) ABSTRACT

A method for dynamically controlling the transmit power of transmission streams transmitted via multiple antennas is disclosed. A transmit power level for multiple streams is determined based on a first reference channel. The difference of signal to interface ratios (SIRs) between two reference channels may represent a power offset. The power offset may be used to determine gain factors used to transmit data channels on the secondary stream with reference to the gain factor of the first reference channel. The power offset may be used to determine other parameters, such a serving grant or transport block sizes of channels carried on the secondary stream. The power offset may allow transmission parameters of channels on the secondary stream to be determined based on the transmit power level of the primary stream and a gain factor for a reference channel transmitted via the primary stream.

31 Claims, 19 Drawing Sheets

(56) References Cited

OTHER PUBLICATIONS

3rd Generation Partnership Project (3GPP), TS 25.213, V9.0.0, "3rd Generation Partnership Project; Technical Specification Group Radio Access Network; Spreading and modulation (FDD) (Release 9)", Sep. 2009, 36 pages.

3rd Generation Partnership Project (3GPP), Ts 25.214, V9.0.0, "3rd Generation Partnership Project; Technical Specification Group Radio Access Network; Physical layer procedures (FDD) (Release 9)", Sep. 2009, 95 pages.

3rd Generation Partnership Project (3GPP), TS 25.321, V9.0.0, "3rd Generation Partnership Project; Technical Specification Group Radio Access Network; Medium Access Control (MAC) protocol specification (Release 9)", Sep. 2009, 187 pages.

3rd Generation Partnership Project (3GPP), TS 25.211, V9.0.0, "3rd Generation Partnership Project; Technical Specification Group Radio Access Network; Physical channels and mapping of transport channels onto physical channels (FDD) (Release 9)", Sep. 2009, 56 pages.

3rd Generation Partnership Project (3GPP), Ts 25.212, V9.0.0, "3rd Generation Partnership Project; Technical Specification Group Radio Access Network; Multiplexing and channel coding (FDD) (Release 9)", Sep. 2009, 108 pages.

* cited by examiner

POWER CONTROL FOR CLOSED LOOP TRANSMIT DIVERSITY AND MIMO IN UPLINK

CROSS REFERENCE TO RELATED APPLICATIONS

This application claims the benefit of U.S. Provisional Application No. 61/322,448 filed Apr. 9, 2010, U.S. Provisional Application No. 61/330,153 filed Apr. 30, 2010, U.S. Provisional Application No. 61/410,682 filed Nov. 5, 2010, and U.S. Provisional Application No. 61/431,237 filed Jan. 10, 2011, the contents of which are hereby incorporated by reference herein.

TECHNICAL FIELD

This application is related to wireless communication systems, particularly wireless communication systems which transmit via multiple antennas.

BACKGROUND

Multiple antenna technologies are used in cellular communication systems to improve the robustness of downlink data transmission and to achieve higher data throughput. For example, in 3rd Generation Partnership Project (3GPP), the closed loop transmit diversity was introduced into downlink transmission in Universal Mobile Telecommunications System (UMTS) and, more recently, the Dual Stream Transmit Antenna Array (D-TxAA) multiple-input and multiple-output (MIMO) technology was adopted to downlink High Speed Downlink Packet Access (HSDPA) over higher speed data channels. The enhancements brought by the multiple antenna technologies, however, are only implemented in the downlink direction in UMTS Wideband Code Division Multiple Access (WCDMA) systems. Moreover, there is no mechanism for power reference in transmit diversity and MIMO implementation in uplink transmission. Proposed open-loop transmit diversity techniques, such as switched antenna and beamforming, may be suboptimal solutions because they may not support direct dynamic feedback.

SUMMARY

Disclosed herein are methods and systems for dynamically controlling the transmit power of transmission streams transmitted via multiple antennas. The method for providing transmit power control and configuring transmission parameters for uplink (UL) transmissions utilizing multiple antennas, may include transmitting data using at least two antennas, transmitting a first reference channel, receiving first feedback for the first reference channel, the first feedback indicating whether a power level of the first reference channel should be increased or decreased, and adjusting a power level of a transmission from the at least two antennas based on the first feedback. The power reference may be used to adjust transmission power for one or both streams or one or both antennas. A second reference channel may also be transmitted. The first reference channel may be transmitted on a first stream which may be precoded with a first set of antenna precoding weights. The second reference channel may be transmitted on a second stream which may be precoded with a second set of antenna precoding weights. The first set of precoding weights may be different than the second set of precoding weights. A difference of a received signal to interference ratio of the first reference channel and a received signal to interference ratio of the second reference channel may be used to configure transmission parameters for channels on the secondary stream.

The difference of signal to interface ratios (SIRs) between the two reference channels may represent a power offset. The power offset may be used to determine gain factors used to transmit data channels on the secondary stream with reference to the gain factor of the first reference channel. The power offset may be used to determine other parameters, such as a serving grant or transport block sizes of channels carried on the secondary stream. The power offset may allow transmission parameters of channels on the secondary stream to be determined based on the transmit power level of the primary stream and a gain factor for a reference channel transmitted via the primary stream.

Methods of measuring a quality of a secondary transmission stream for transmissions utilizing multiple antennas and sending power control feedback using a single power control loop are also disclosed. A first reference channel associated with a first transmission stream may be received, a second reference channel associated with a second transmission stream may also be received, a quality metric for the second transmission stream may be determined based on a comparison of a characteristic of the second transmission stream relative to a characteristic of the first transmission stream, and the quality metric for the second transmission stream may be transmitted as a feedback for the secondary stream. The quality metric for the secondary transmission stream may be used to determine gain factors used to transmit data channels on the secondary stream with reference to the gain factor of the first reference channel.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
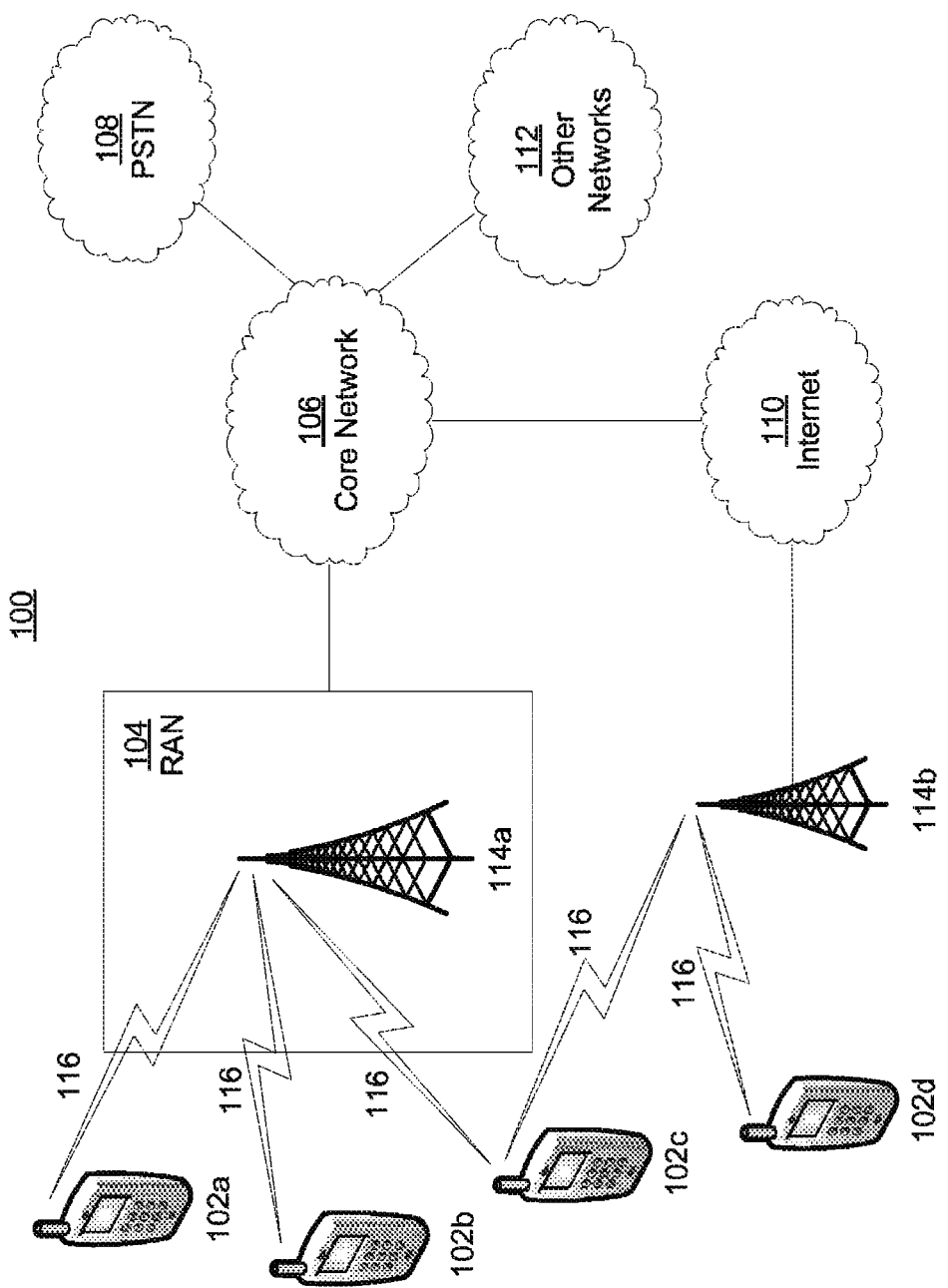
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
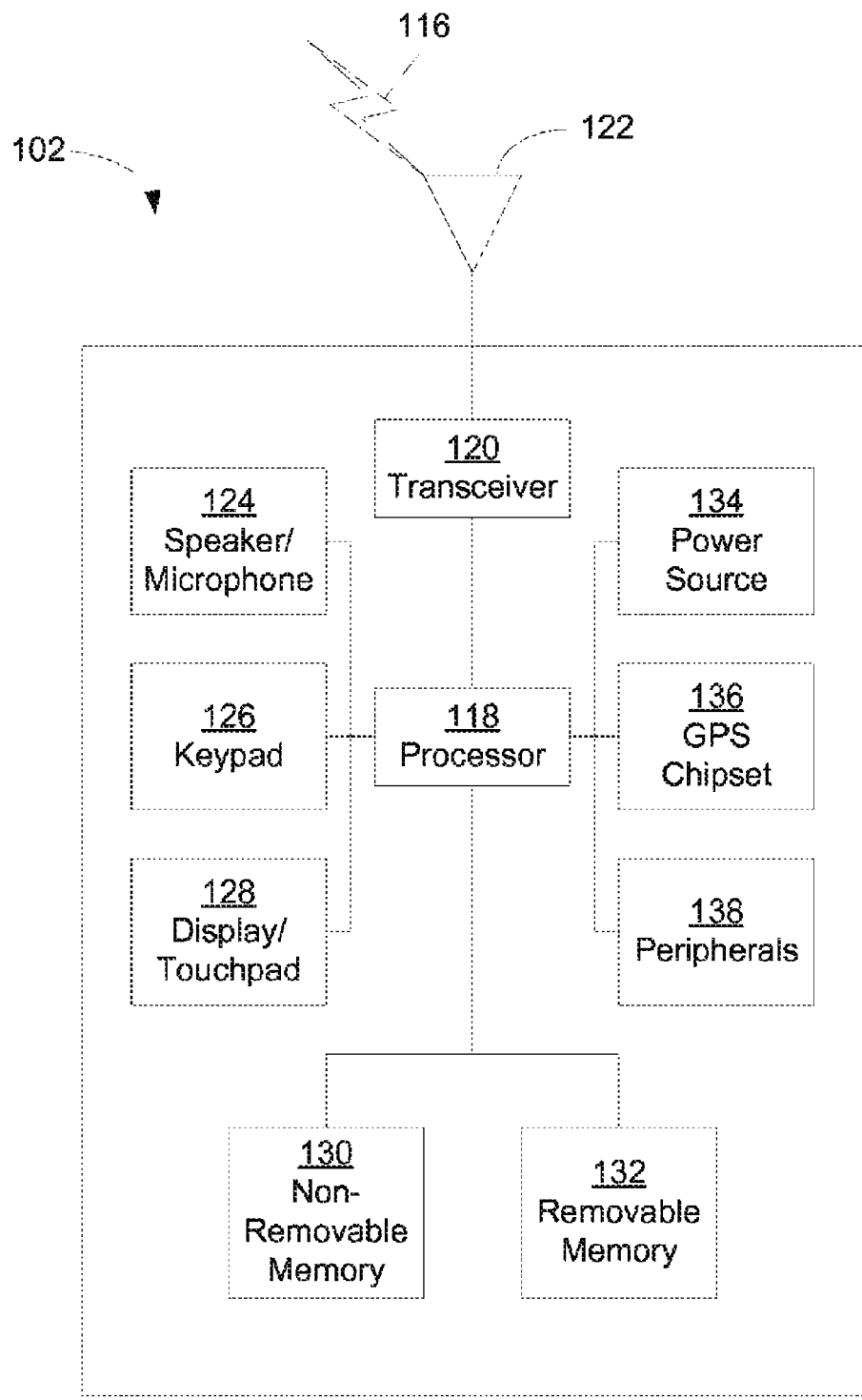
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
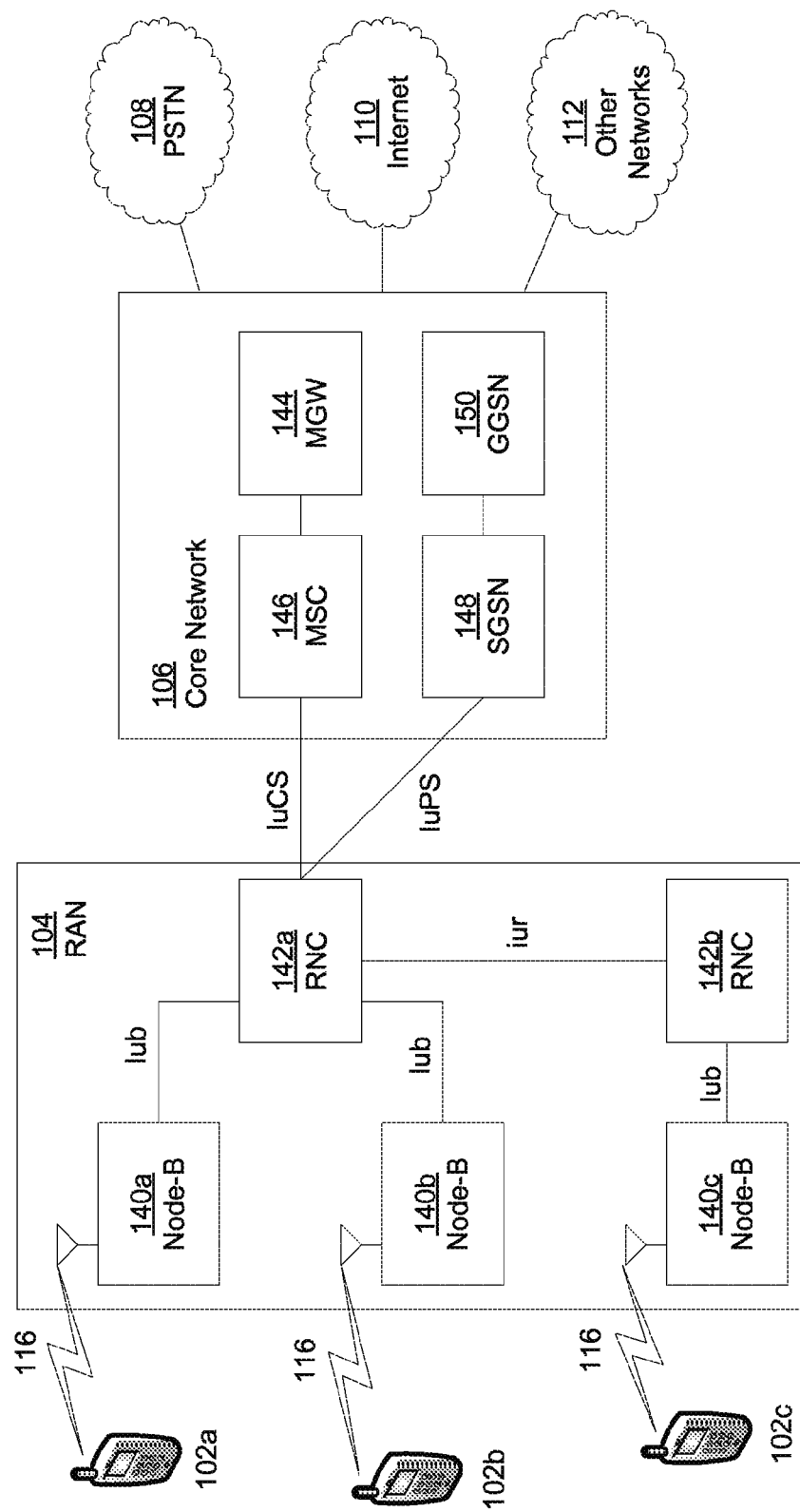
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an MPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

In order to control the transmit power for closed loop transmit diversity and/or for MIMO in the uplink direction, new methods for referencing power levels may need to be defined. For example, a transmitter structure with a MIMO-precoded power reference channel that enables power reference of High-Speed Uplink Packet Access (HSUPA)'and simple channel estimation at an uplink receiver may need to be designed. Due to the differing nature of the transmission channel characteristics for different precoded channels, using a reference channel, such as the dedicated physical control channel (DPCCH), as a power control indicator for data channels may need to be accomplished in a different manner power references used in UMTS.

To control power levels of data channels in UMTS, a user equipment (UE) may continuously transmit on the DPCCH on the uplink. The DPCCH may carry pilot information as well as power control command information. A NodeB on the downlink may control the DPCCH power level via transmit power control (TPC) commands that may be carried, for example, on the Fractional Dedicated Physical Channel (F-DPCH). The NodeB may adjust the power of the DPCCH via an inner-loop power control mechanism to ensure that the signal to interference plus noise ratio (SINR) of the DPCCH is maintained at a target level. This target level may be determined via the outer-loop power control mechanism that may be driven by the UE block error rate as measured by a Radio Network Controller (RNC).

In UMTS, the power of other uplink channels may be calculated based on a gain factor applied on top of the DPCCH power, which may act as a reference power level. This approach, in combination with the DPCCH being power-controlled, may ensure that the channels transmitted by the UE are received with a predictable signal to interference-plus-noise ratio (SINR) at the NodeB. The SINR level for other channels may then depend on the DPCCH target SINR and also the power offset of each channel.

In HSUPA, the uplink Enhanced Dedicated Channel (E-DCH) may include enhanced DPCCH (E-DPCCH) control and enhanced Dedicated Physical Data Control Channel (E-DPDCH) data parts, and may be power-controlled in relation to the uplink DPCCH on a time slot interval basis. In an embodiment, a target SINR, for instance the target error rate, may have already been achieved via either inner or outer power control loop for the DPCCH channel. The performance of the E-DCH for high speed data transmission may be controlled at a desired level by specifying a power offset in reference to the power of the DPCCH. For example, the gain factors of the E-DPDCH ($\beta_{ed}$) and the E-DPCCH ($\beta_{ec}$), may be calculated based on the reference power scaling of the DPCCH:

$$\beta_{ec} = \beta_c \cdot A_{ec} \quad \text{(Equation 1)}$$

$$\beta_{ed,ref} = \beta_c \cdot A_{dc} \quad \text{(Equation 2)}$$

where $\beta_c$ may be the gain factor of the DPCCH, and $A_{ec}$ and $A_{dc}$ may be the scaling offset parameters signaled by network. The E-DPDCH gain factor, $\beta_{ed}$, may be determined based on $\beta_{ed,ref}$, which may be a reference gain factor for the E-DPDCH. $\beta_{ed}$ may vary based on an enhanced transport format combination (E-TFC) selection result and/or hybrid automatic-repeat-request (HARQ) offsets. For the ith (where i may be an integer) E-TFC, the temporary variable $\beta_{ed,i,harq}$ may be determined using the E-DPDCH power extrapolation formula, signaled by higher layers as follows:

$$\beta_{ed,i,harq} = \beta_{ed,ref} \sqrt{\frac{L_{e,ref}}{L_{e,i}}} \sqrt{\frac{K_{e,i}}{K_{e,ref}}} \cdot 10^{\left(\frac{\Delta_{harq}}{20}\right)} \quad \text{(Equation 3)}$$

where $L_{e,ref}$ may be the number of E-DPDCHs used for the reference E-TFC, $L_{e,i}$ may be the number of E-DPDCHs used for the i:th E-TFC, $K_{e,ref}$ may be the transport block size of the reference E-TFC, $K_{e,i}$ may be the transport block size of the i:th E-TFC, and $\Delta_{harq}$ may be the HARQ offset. Alternatively, $\beta_{ed,i,harq}$ may be determined by the E-DPDCH power interpolation formula (Equation 4), signaled by higher layers as follows:

$$\beta_{ed,i,harq} = \sqrt{\frac{L_{e,ref,1}}{L_{e,i}}} \cdot \sqrt{\left(\frac{\frac{L_{e,ref,2}}{L_{e,ref,1}}\beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2} \cdot 10^{\left(\frac{\Delta_{harq}}{20}\right)} \quad \text{(Equation 4)}$$

with the exception that $\beta_{ed,i,harq}$ may be set to 0 if:

$$\left(\frac{\frac{L_{e,ref,2}}{L_{e,ref,1}}\beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2 \leq 0 \quad \text{(Equation 5)}$$

where $\beta_{ed,ref,1}$ may be the reference gain factors of the primary reference E-TFC, $\beta_{ed,ref,2}$ may be the reference gain factors of the secondary reference E-TFC, $L_{e,ref,1}$ may be the number of E-DPDCHs used for the primary reference E-TFC, $L_{e,ref,2}$ may be the number of E-DPDCHs used for the secondary reference E-TFC, $L_{e,i}$ may be the number of E-DPDCHs used for the i:th E-TFC, $K_{e,ref,1}$ may be the transport block sizes of the primary reference E-TFC, $K_{e,ref,2}$ may be the transport block sizes of the secondary reference E-TFC, and $K_{e,i}$ may be the transport block size of the i:th E-TFC.

In order to design closed loop transmit diversity or MIMO over uplink HSUPA, a new reference mechanism may need to be designed. Proposed solutions are described below, wherein the DPCCH reference channel may or may not be precoded. If the DPCCH is precoded, a solution may be adopted that may allow the reference channel, for example DPCCH, to be transmitted through the two or more antennas without being affected by the precoding weights. The SINR/error rate control mechanism described above may be beneficial in a scenario where the DPCCH and E-DCH channels are closely related. For example, both may experience the same channel and interference conditions, and uplink transmitter/receiver structures being used are similar. However, using the SINR/error rate control mechanism when the DPCCH and E-DCH channels are not closely related may result in excessive bit error on E-DCH or under-utilization of the UE transmit power. In other words, the power reference link for E-DCH may be broken, which may result in difficulties in controlling the transmission quality of all the physical channels over the precoded path. In addition, the uplink resource allocation procedure may also be impacted as the uplink serving grant mechanism may be based on the reference power provided by the DPCCH. A similar problem may occur if the DPCCH is not precoded and straightforward channel estimation at the uplink receiver is desired.

First, an embodiment wherein the DPCCH is precoded and provides power control and power reference for multiple streams for uplink data channels is disclosed. Following the description of the DPCCH precoded design, an embodiment for providing power reference based on a non-precoded DPCCH is disclosed. It may be appreciated that many of the topics disclosed for each embodiment may apply to situations wherein the DPCCH may be either precoded or non-precoded. Therefore, the descriptions included herein are not intended to be limiting to any specific embodiment, and aspects described for a specific embodiment may also be applicable to other examples and design schemes.

Figure 2:
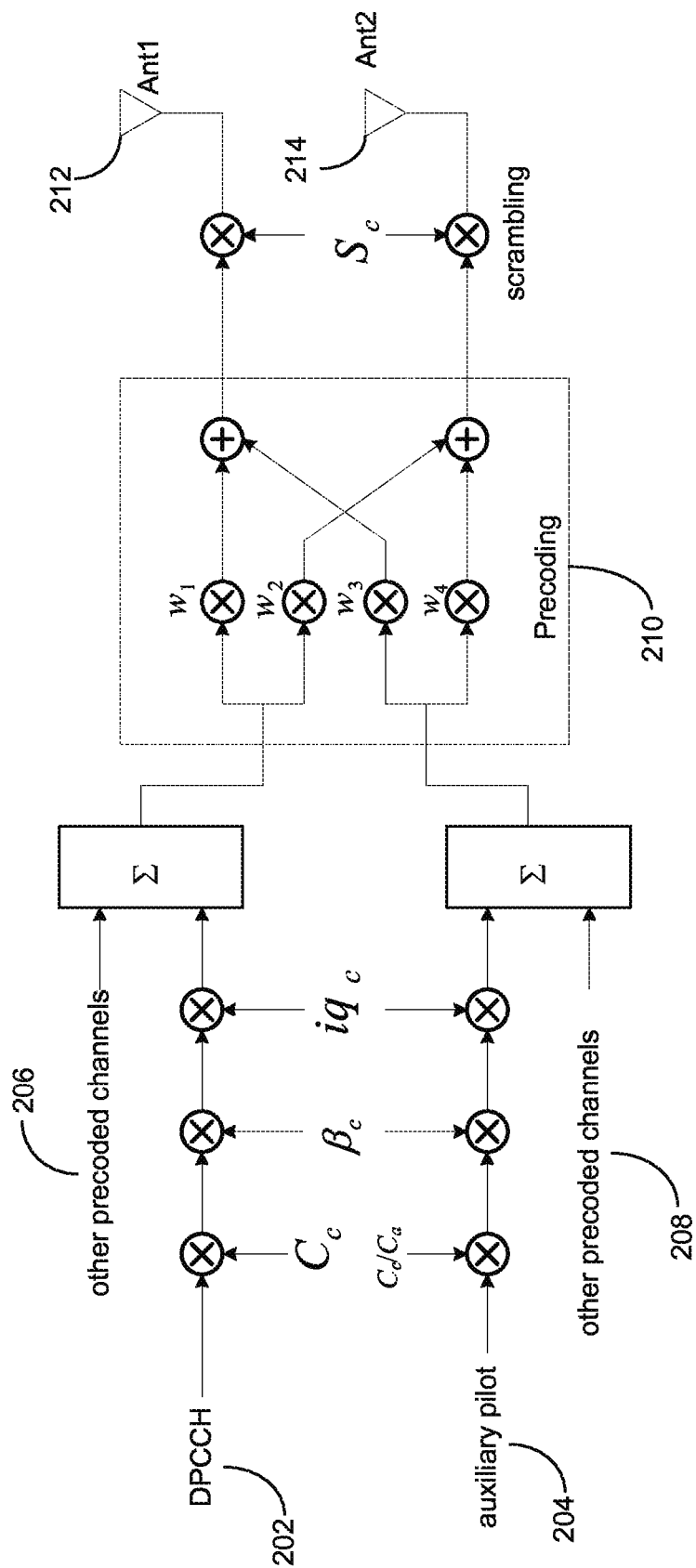
FIG. 2 illustrates an example MIMO transmitter structure with precoded reference channels.

FIG. 2 is illustrates a system block diagram of an example MIMO transmitter structure. As shown in FIG. 2, there may be two streams of signal for transmission via two uplink antennas. In another embodiment, more than two streams may be implemented. For simplicity of explanation, the following examples will be described with reference to two streams. As shown, the power reference channel, DPCCH 202, may be precoded by the set of MIMO precoding coefficients $w_1$, $w_2$, $w_3$, $w_4$ that may be complex-valued. For example, DPCCH 202 may be precode by MIMO precoding coefficients $w_1$ and $w_2$. DPCCH 202 may be processed by a spreading operation before being fed into precoder 210. The spreading operation may include spreading by the channelization code $C_c$, scaling by gain factor $\beta_c$, and/or I/Q branch selection by I/Q index $iq_c$. Other precoded channels 206 may also be carried on the primary MIMO stream. For example, other precoded channels 206 may be precoded by the set of MIMO precoding coefficients $w_1$ and $w_2$.

As shown in FIG. 2, auxiliary pilot 204 on the second stream of the MIMO channel may also be precoded. For example, auxiliary pilot 204 may be precoded by the set of MIMO precoding coefficients $w_3$ and $w_4$. Auxiliary pilot 204 may be carried on an auxiliary channel, and may facilitate channel estimation. In an embodiment, auxiliary pilot 204 may be a secondary DPCCH channel carrying another set of control information. In an embodiment, auxiliary pilot 204 may use same pilot sequence as DPCCH 202. In another embodiment, auxiliary pilot 204 may use a different pilot sequence than DPCCH 202. The signal from auxiliary pilot 204 may be processed by the same spreading operation as DPCCH 202, and may be fed into precoder 210. Alternatively, as shown in FIG. 2, auxiliary pilot may be spread using a second channelization code $C_a$, which may be different than $C_c$. As shown, the signal from auxiliary pilot 204 and the signal from DPCCH 202 may be fed into two separate inputs of precoder 210. Other precoded channels 208 may also be carried on the secondary MIMO stream. For example, other precoded channels 208 may be precoded by the set of MIMO precoding coefficients $w_3$ and $w_4$.

The precoding coefficients $w_1$, $w_2$, $w_3$, and $w_4$ may be received from the NodeB over a reverse feedback channel, or may be calculated by the transmitter using the information available at UE. For example, the precoding weights may be represented in a matrix form:

$$W = \begin{bmatrix} w_1 & w_3 \\ w_2 & w_4 \end{bmatrix} \quad \text{(Equation 6)}$$

In an embodiment, the W may unitary. In another example, $W^H W = I$.

As shown, after being precoded, the two signals may be scrambled using scrambling code $S_c$ and routed to antenna 212 and antenna 214 for transmission. Other uplink channels such as the other precoded channels 206 and other precode channels 208 may include, but are not limited to, the DPDCH, HS-DPCCH, E-DPCCH, E-DPDCH, or the like.

Figure 3:
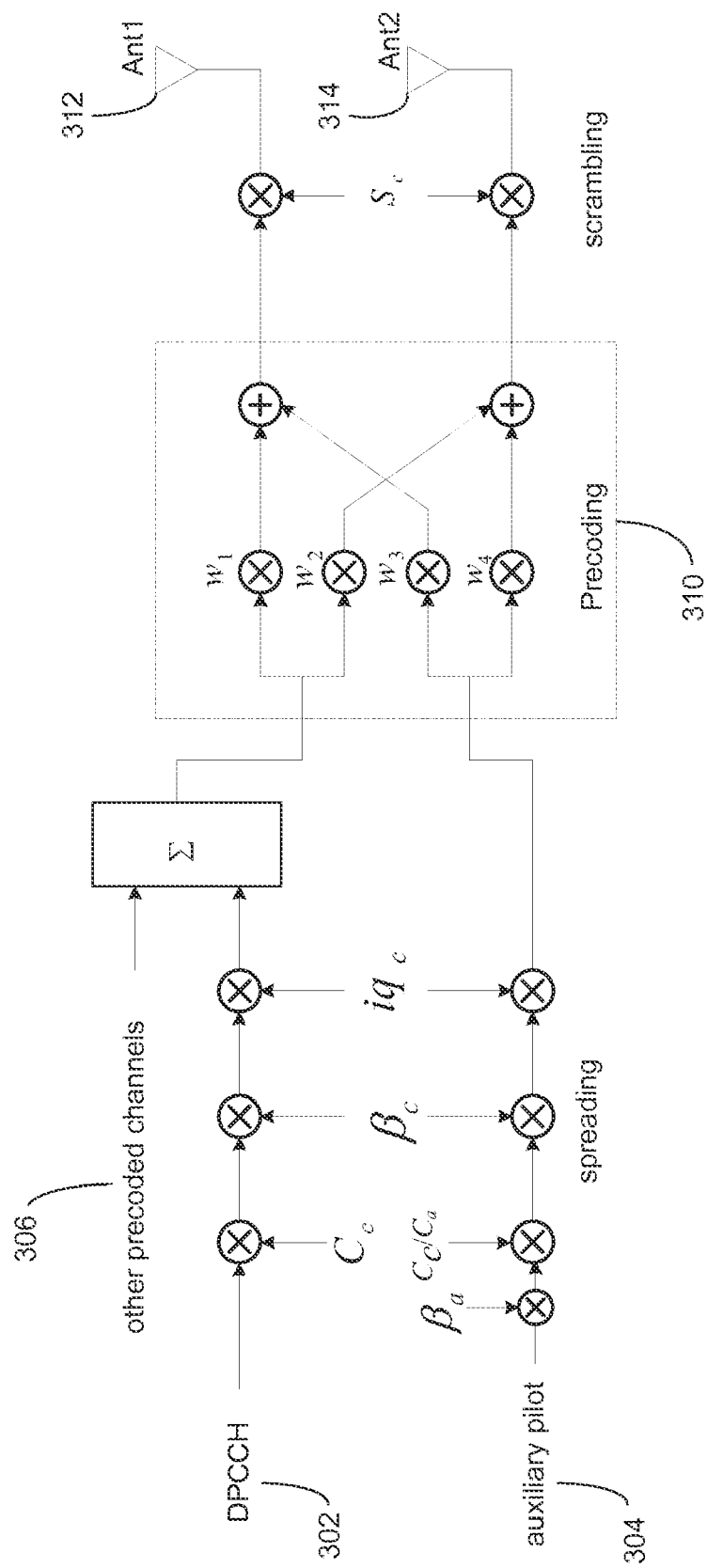
FIG. 3 illustrates an example MIMO transmitter structure for transmission diversity with precoded reference channels with a modified structure to include scaling on the auxiliary channel.

FIG. 3 illustrates another example MIMO transmitter structure for transmission diversity with a precoded reference channel. As shown, DPCCH 302 may be processed by a spreading operation before being combined with other precoded channels 306. DPCCH 302 and other precoded channels 306 may be input into precoder 310. In an example, DPCCH 302 and other precoded channels 306 may be precoded by the set of precoding weights $w_1$ and $w_2$. Auxiliary pilot 304 may be spread by a channelization code $C_a$, which may be the same or different from the one used for DPCCH 302 ($C_c$). In this embodiment, auxiliary pilot 304 is not combined with other precoded channels prior to being input into precoder 310. For example, auxiliary pilot 304 may be precoded using the set of precoding weights $w_3$ and $w_4$. As shown, after being precoded, the two signals may be scrambled using scrambling code $S_c$ and routed to antenna 312 and antenna 314 for transmission. In an example embodiment, auxiliary channel 304 may have an additional gain factor, $\beta a$, applied prior to the spreading operation. The additional gain factor may allow the control of the power of auxiliary channel 304 with reference to the primary stream.

Figure 4:
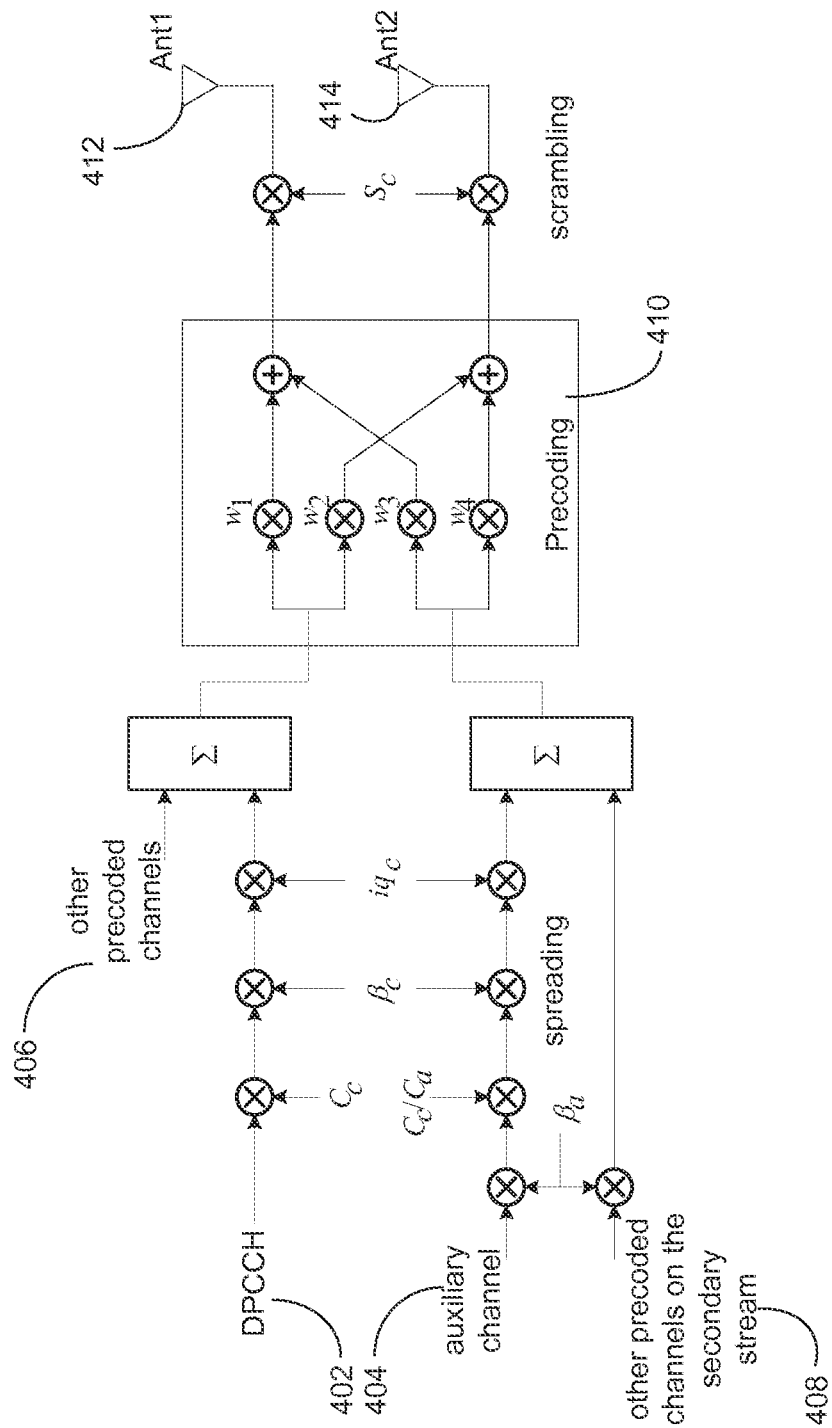
FIG. 4 illustrates another example MIMO transmitter structure with precoded reference channels.

FIG. 4 illustrates another example MIMO transmitter structure with a precoded reference channel. DPCCH 402 may be processed by a spreading operation before being combined with other precoded channels 406. DPCCH 402 and other precoded channels 406 are then input into precoder 410. For example, DPCCH 402 and other precoded channels 406 may be precoded by the set of precoding weights $w_1$ and $w_2$. In an example embodiment, auxiliary channel 404 and other precoded channels on the secondary stream 408 may have an additional gain factor, $\beta_a$, applied prior to the spreading operation. The additional gain factor may allow the control of the power of auxiliary channel 404 with reference to the primary stream. Auxiliary channel 404 may also be processed by a spreading operation before being combined with other precoded channels on the secondary stream 408 and input into precoder 410. For example, auxiliary channel 404 and other precoded channels on the secondary stream 408 may be precoded using the set of precoding weights $w_3$ and $w_4$. The outputs of precoder 410 may then be scrambled using scrambling code $S_c$, and sent to antenna 412 and antenna 414 for transmission.

Figure 5:
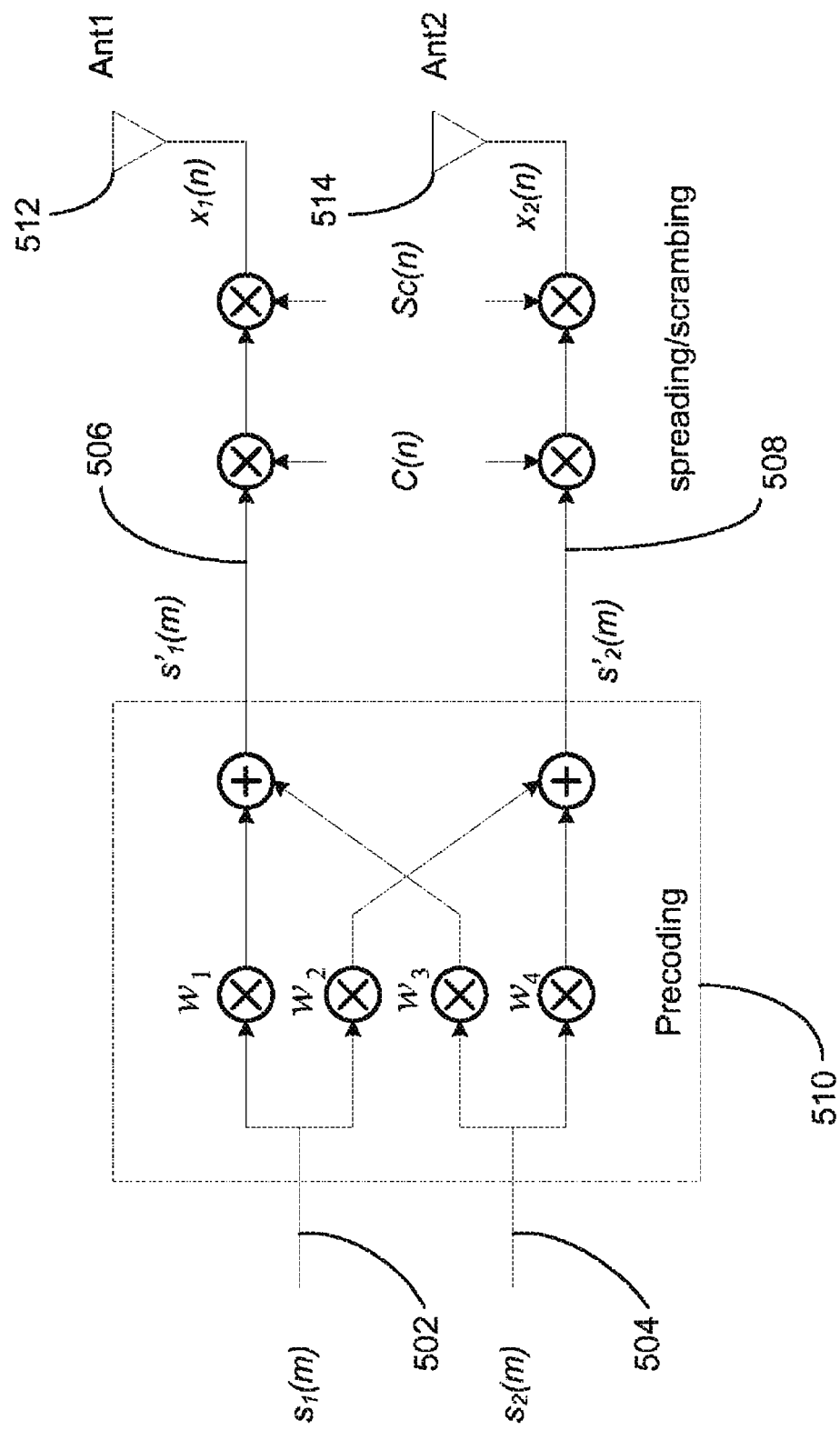
FIG. 5 illustrates a simplified modeling of the reference channels.

FIG. 5 illustrates a simplified modeling of the reference channels. It should be understood that although the order of the spreading operation and the precoding operation is switched, the operations may be mathematically equivalent to the operations shown in FIGS. 1-4. In an example embodiment, m may be an index running on a symbol basis and n may be an index running on a chip basis. The relation between the m and n may be as follows:

$$n = n' + SFm, \; n' = 0, 1, 2, \ldots, SF-1 \quad \text{(Equation 7)}$$

where SF may be the spreading factor and where n'=mod(n, SF). As shown in FIG. 5, $s_1(m)$ may represent a DPCCH channel, and $s_2(m)$ may represent an auxiliary channel signal. Precoder 510 may include two inputs, primary precoder input 502 and secondary precoder input 504. $s_1(m)$ may be the signal at primary precoder input 502 and $s_2(m)$ may be the signal at secondary precoder input 504. $s'_1(m)$ may be the signal at primary precoder output 506 and $s'_2(m)$ may be the signal at secondary precoder output 508. The spreading operation, which may be represented by C(n), may combine channelization, scaling, and/or I/Q branch selection. For example, $C(n) = C_c(n) \times \beta_c \times iq_c$. The scramble operation may be performed by multiplying $S_c(n)$ to the respective signals. The primary output signal at antenna 512 may be represented by $x_1(n)$. The secondary output signal at antenna 514 may be represented by $x_2(n)$. Based on the transmitter structure shown in FIG. 5, the primary output signal $x_1(n)$ and the secondary output signal $x_1(n)$ may be described as:

$$x_1(n) = Sc(n)C(n')s'_1(m) = Sc(n)C(n')[s_1(m)w_1 + s_2(m)w_3] \quad \text{(Equation 8)}$$

$$x_2(n) = Sc(n')C(n')s'_2(m) = Sc(n)C(n')[s_1(m)w_2 + s_2(m)w_4] \quad \text{(Equation 9)}$$

where n'=mod(n,SF) and m=$\lfloor$n/SF$\rfloor$ where $\lfloor x \rfloor$ may represent the closest integer to x from below.

The pilot signal contained in the DPCCH may be used as a reference since the pattern of the pilot signal is known to both the transmitter and the receiver. When introducing the auxiliary channel, the pilot pattern may possess certain properties such that the spatial properties of a MIMO channel may be fully explored and determined.

It may be assumed that $s_{p1}(m)$, where m∈P, may be part of $s_1(m)$ that represents a pilot signal transmitted on the DPCCH. P may be a set containing all the symbol indices in a radio frame related to the pilot. The pilot signal in the auxiliary channel, $s_{p2}(m)$, may be defined along the same symbol indices and may be orthonormal to $s_{p1}(m)$, for example:

$$\frac{1}{M} \sum_{m \in P} s_1(m) s_2^*(m) = 0 \quad \text{(Equation 10)}$$

$$\frac{1}{M} \sum_{m \in P} |s_1(m)|^2 = \frac{1}{M} \sum_{m \in P} |s_2(m)|^2 = 1 \quad \text{(Equation 11)}$$

where M may be the number of symbols in the set P. $s_1(m)$ may be the signal at primary precoder input 502 and $s_2(m)$ may be the signal at secondary precoder input 504. In matrix form, Equation 10 and Equation 11 may be expressed in the form:

$$\frac{1}{M} \sum_{m \in P} S(m) S^H(m) = I, \; S(m) = \begin{bmatrix} s_{p1}(m) \\ s_{p2}(m) \end{bmatrix} \quad \text{(Equation 12)}$$

If the precoding matrix W is unitary, then after precoding processing the relationship between the pilot signals still holds and their relationship may be expressed as:

$$\frac{1}{M} \sum_{m \in P} S'(m) S'^H(m) = W \left[ \frac{1}{M} \sum_{m \in P} S(m) S^H(m) \right] W^H = I \quad \text{(Equation 13)}$$

$$S'(m) = \begin{bmatrix} s'_{p1}(m) \\ s'_{p2}(m) \end{bmatrix}$$

where $s'_{p1}(m)$ may be part of the signal at primary precoder output 506 and $s'_{p2}(m)$ may be part of the signal at secondary precoder output 508. The property described in Equation 13 may be useful for calculating channel properties, as is described below. In another embodiment, the pilot signal on the auxiliary channel, $s_{p2}(m)$, may be orthogonal to $s_{p1}(m)$, rather than orthonormal to $s_{p1}(m)$, for example:

$$\frac{1}{M}\sum_{m\in P} S(m)S^H(m) = \begin{bmatrix} 1 & 0 \\ 0 & \beta_a^2 \end{bmatrix},$$ (Equation 14)

$$S(m) = \begin{bmatrix} s_{p1}(m) \\ s_{p2}(m) \end{bmatrix}$$

where $\beta_a$ may be a scaling factor applied on the auxiliary pilot.

Figure 6:
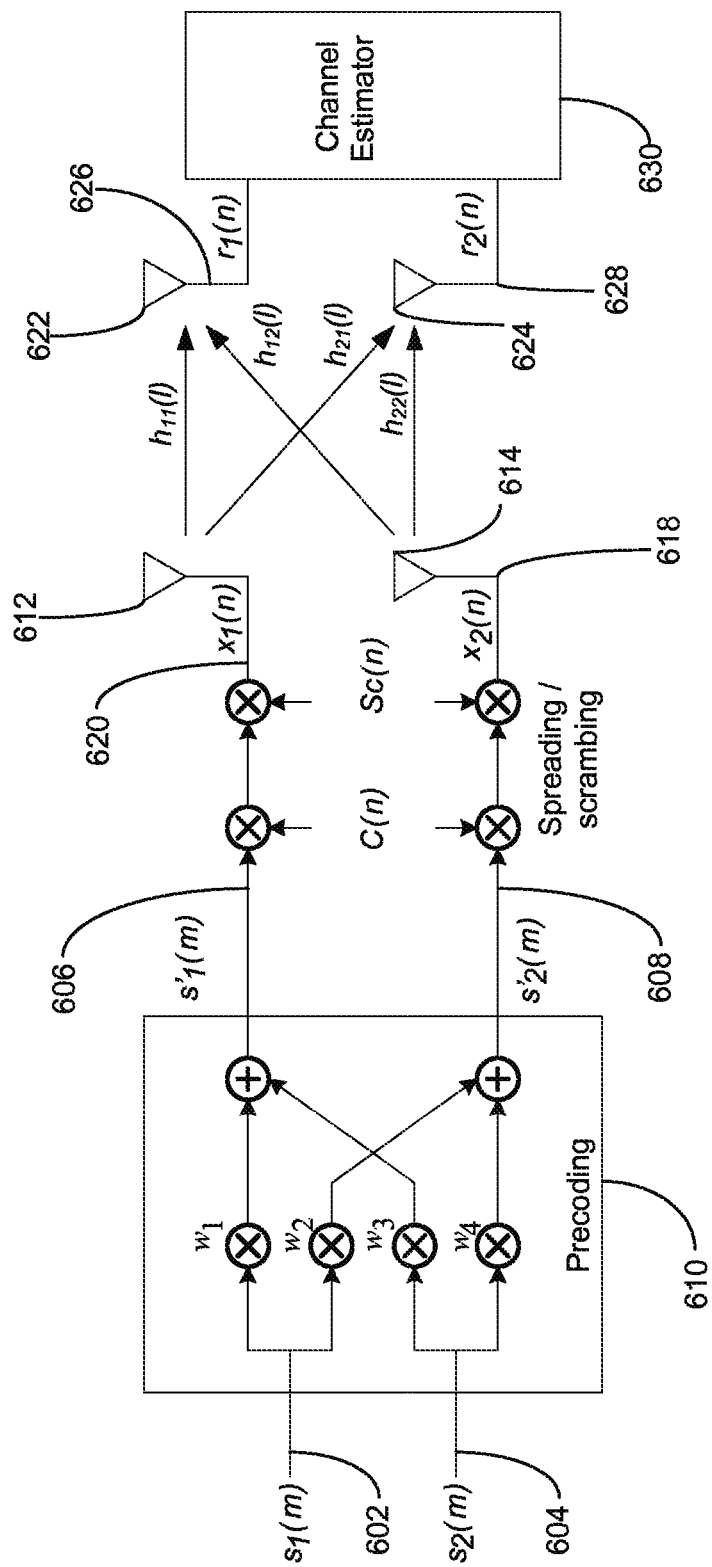
FIG. 6 illustrates an example channel estimation.

FIG. 6 illustrates an example block diagram of a model of a MIMO transmitter and receiver that may be used to develop a model for estimating channel characteristics. As shown in FIG. 6, $s_1(m)$ may represent a DPCCH signal, and $s_2(m)$ may represent an auxiliary channel signal. Precoder 610 may include two inputs, primary precoder input 602 and secondary precoder input 604. $s_1(m)$ may be the signal at primary precoder input 602 and $s_2(m)$ may be the signal at secondary precoder input 604. $s'_1(m)$ may be the signal at primary precoder output 606 and $s'_2(m)$ may be the signal at secondary precoder output 608. The spreading operation, which may be represented by $C(n)$, may combine channelization, scaling, and I/Q branch selection. For example, $C(n)=C_c(n)\times\beta_c\times iq_c$. The scramble operation may be performed by multiplying $S_c(n)$ to the respective signals. The primary output signal 620 at antenna 612 may be represented by $x_1(n)$. The secondary output signal 618 at antenna 614 may be represented by $x_2(n)$.

As shown in FIG. 6, the MIMO channels may be characterized by channel responses for each individual path, $h_{11}(l)$, $h_{12}(l)$, $h_{21}(l)$, and $h_{22}(l)$ where l may be a sample index. The primary received signal 626 received at antenna 622 of the receiver may be represented by $r_1(n)$. The secondary received signal 628 received at antenna 624 of the receiver may be represented by $r_2(n)$. $r_1(n)$ and $r_1(n)$ may be inputs to channel estimator 630. The received signals may be expressed as:

$$r_1(n) = \sum_{l=0}^{L-1} [h_{11}(l)x_1(n-l) + h_{12}(l)x_2(n-l)]$$ (Equation 15)

$$r_2(n) = \sum_{l=0}^{L-1} [h_{21}(l)x_1(n-l) + h_{22}(l)x_2(n-l)]$$ (Equation 16)

where L may be the length of the MIMO channel. Additionally, noise terms may be omitted in order to simplify the analysis.

When the channel estimation is implemented with a conventional correlation structure, the received data signals, $r_1(n)$ and $r_2(n)$, may be correlated and averaged with an sequence known to both of the transmitter and receiver. This sequence typically may include the pilot information carried in this example over the DPCCH and auxiliary pilot channels. In particular, denote i=1,2 and j=1,2 as the indices for the receive and transmit antenna respectively. The outputs of the correlator may be expressed as follows:

$$\frac{1}{M}\frac{1}{SF}\sum_{\lfloor n/SF \rfloor \in P} r_i(n+l)x_j^*(n) =$$ (Equation 17)

$$\frac{1}{M}\sum_{m\in P}\frac{1}{SF}\sum_{n'=0}^{SF-1} r_i(n'+mSF+l)x_j^*(n'+mSF) :=$$

$$\frac{1}{M}\sum_{m\in P}\frac{1}{SF}\sum_{n'=0}^{SF-1}\sum_{l'=0}^{L-1}\bigg[h_{i1}(l')x_1(n'+mSF+l-l') +$$

$$h_{i2}(l)x_2(n'+mSF+l-l')\bigg]x_j^*(n'+mSF) =$$

$$\sum_{l'=0}^{L-1} h_{i1}(l')\frac{1}{M}\sum_{m\in P}\frac{1}{SF}\sum_{n'=0}^{SF-1} x_1(n' +$$

$$mSF + l - l')x_j^*(n'+mSF) +$$

$$\sum_{l'=0}^{L-1} h_{i2}(l')\frac{1}{M}\sum_{m\in P}\frac{1}{SF}\sum_{n'=0}^{SF-1} x_2(n'+mSF+l-l')x_j^*($$

$$n'+mSF),$$

By substituting the expression for $x_1(n)$ of Equations 8 and the expression for $x_2(n)$ of Equation 9 into the result of Equation 17, the following expression may be derived:

$$\frac{1}{SF}\sum_{n'=0}^{SF-1} x_1(n'+mSF+l-l')x_j^*(n'+mSF) =$$ (Equation 18)

$$\frac{1}{SF}\sum_{n'=0}^{SF-1} Sc(n'+mSF+l-l')Sc^*(n'+mSF)$$

$$C(n'+mSF+l-l')C^*(n'+mSF)s'_1(m)s'^*_j(m) \approx$$

$$\delta(l-l')s'_1(m)s'^*_j(m)$$

Using Equation 8, Equation 9 and the scrambler property, $\delta(l-l')$ may be expressed as:

$$\frac{1}{SF}\sum_{n'=0}^{SF-1} Sc(n'+mSF+l-l')Sc^*(n'+mSF)$$ (Equation 19)

$$C(n'+mSF+l-l')C^*(n'+mSF) =$$

$$\delta(l-l') = \begin{cases} 1 & l=l' \\ 0 & l\neq l' \end{cases}$$

Equation 19 may also be expressed as:

$$\frac{1}{SF}\sum_{n'=0}^{SF-1} x_2(n'+mSF+l-l')x_j^*(n'+mSF) \approx$$ (Equation 20)

$$\delta(l-l')s'_2(m)s'^*_j(m)$$

Finally, substituting the result of Equation 20 into Equation 17 yields:

$$\frac{1}{M}\frac{1}{SF}\sum_{\lfloor n/SF \rfloor \in P} r_i(n+l)x_j^*(n) =$$ (Equation 21)

$$\frac{1}{M}\sum_{m\in P}[h_{i1}(l)s'_1(m)s'^*_j(m) + h_{i2}(l)s'_2(m)s'^*_j(m)] =$$

-continued $$h_{i1}(l)\frac{1}{M}\sum_{m\in P}s'_1(m)s'^*_j(m) +$$

$$h_{i2}(l)\frac{1}{M}\sum_{m\in P}s'_2(m)s'^*_j(m) = h_{ij}(l)$$

where the orthoganality property associated with $s'_1(m)$ and $s'_2(m)$ described above is applied. Based on the above demonstration, it is to be understood that the transmitter structures shown in FIGS. 1-6 may be configured to perform channel estimation in an unbiased fashion.

Figure 7:
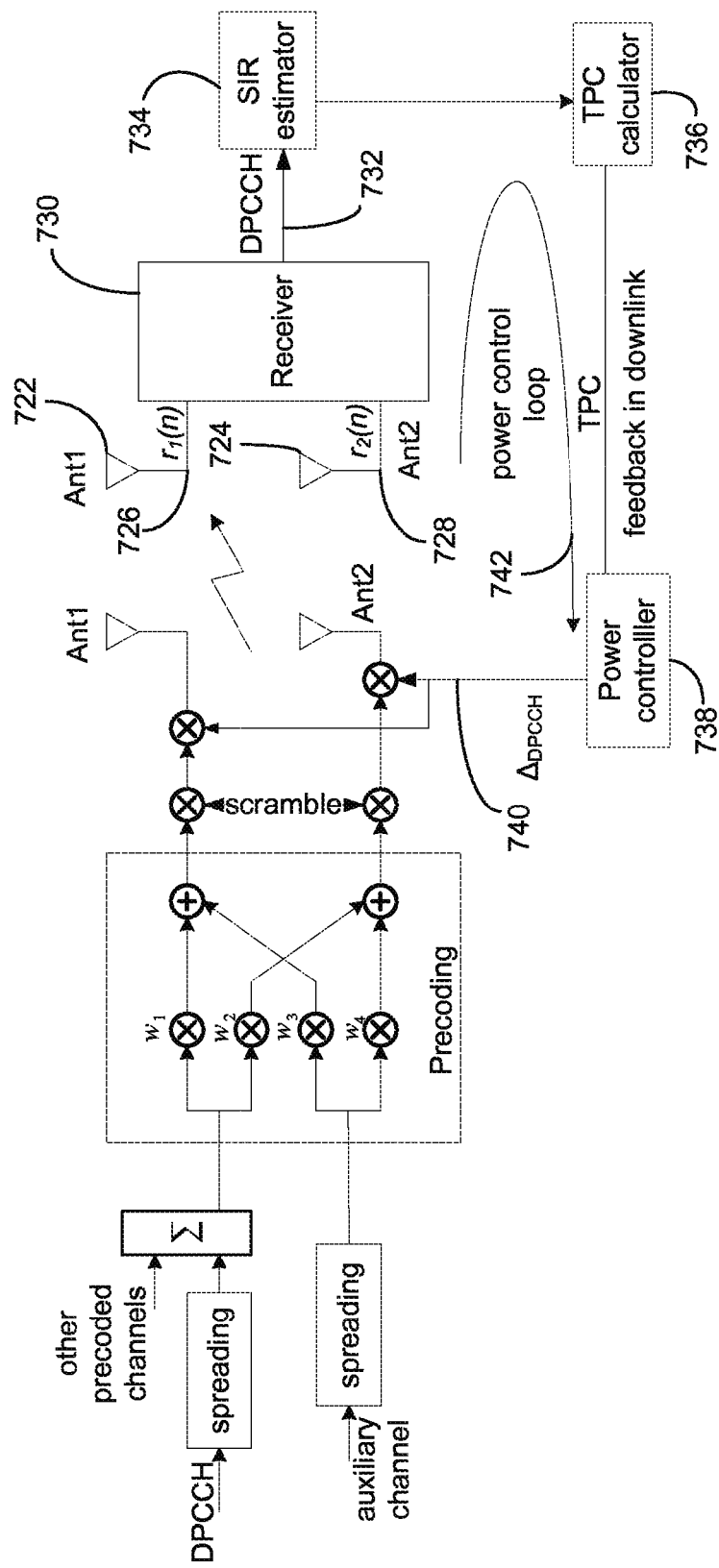
FIG. 7 illustrates an example power control when an UE is configured in closed loop transmit diversity mode.

FIG. 7 illustrates an example power control when an UE is configured in closed loop transmit diversity mode. As shown in FIG. 7, receiver 730 may include primary receiver input 726 which may be coupled to antenna 722. Receiver 830 may also include secondary receiver input 728 which may be coupled to antenna 724. The signal at primary receiver input 726 may be represented by $r_1(n)$. The signal at secondary receiver input 728 may be represented by $r_2(n)$. UE power control may be implemented by a power control loop applied to the received DPCCH which is the signal at receiver output 732. In an embodiment, a single power control loop 742 may be implemented, which may be applied on the DPCCH. The received DPCCH may be precoded by the beamforming coefficients, for example the set of beamforming coefficients $w_1$ and $w_2$. The signal-to-interference ratio (SIR) of the DPCCH channel may be constantly estimated by SIR estimator 734. The SIR may be monitored at receiver 730 in a per-timeslot or per-subframe basis. The SIR of the DPCCH may be compared with a predetermined target value. The predetermined target value may be configured, for example, by the RNC.

As shown in FIG. 7, a Transmit Power Control (TPC) may be generated by TPC calculator 736. TPC may be an up or down command for adjusting the UE transmit power to maintain a desired received signal quality on DPCCH. As can be appreciated, receiver 730, SIR estimator 734, and/or TPC calculator 736 may be implemented in one or more components by the uplink receiver. The UE may receive one or more TPC commands through the feedback channel in the downlink, and may derive a power adjustment variable such as $\Delta_{DPCCH}$ as the control gain factor at power controller 738. Power controller 738 may be implemented in one or more components on the UE. As shown, power control, such as the control gain factor, may be included in output 740 of power controller 738 and may be applied simultaneously to the signals being transmitted on multiple antennas. The detailed procedures and rules of calculating $\Delta_{DPCCH}$ based on TPC commands are specified in 3GPP TS 25.214 v9.0.0, "Physical layer procedures (FDD)," or may be redefined to accommodate the special needs for closed loop transmit diversity and/or uplink MIMO.

Transmission on the auxiliary channel may not be directly involved in the power control, as the pilot signal in the auxiliary channel may be orthogonal to DPCCH. In another embodiment, the pilot signal in the auxiliary channel may be used as part of the input to SIR estimator 734. Other precoded channels, which may use different channelization codes, may be simultaneously transmitted with the same pre-coding coefficients as used for DPCCH.

In another example, the UE may be configured with uplink MIMO operations. In an embodiment, the UE may transmit multiple transport blocks simultaneously. For example, the UE may transmit two simultaneous transport blocks. Each of these transport blocks may be carried over a different MIMO stream. The streams may be mapped to one or a combination of transmit antennas, for example, using a precoding approach. Each stream may carry one or more control channels, for example, to provide for channel estimation at the receiver. For example, in the case of dual-stream MIMO operations, the DPCCH and the auxiliary pilot channel may be transmitted on each stream.

Continuing with this example, each stream may be transmitted using a different precoding vector. In an example embodiment, the precoding vectors may be chosen by the network and signaled to the UE. The precoding vectors may be related, for example the network may select a first precoding vector for the primary stream, and the UE may apply an associated precoding vector for the secondary stream. The association may be implicit based on properties of the precoding vectors. For example, the precoding vector for the secondary stream may be selected to be orthogonal to the precoding vector on the primary stream. In an embodiment, the power control procedure may be performed with either a single power control loop configuration, or a dual power control loop configuration, as described herein below.

Figure 8:
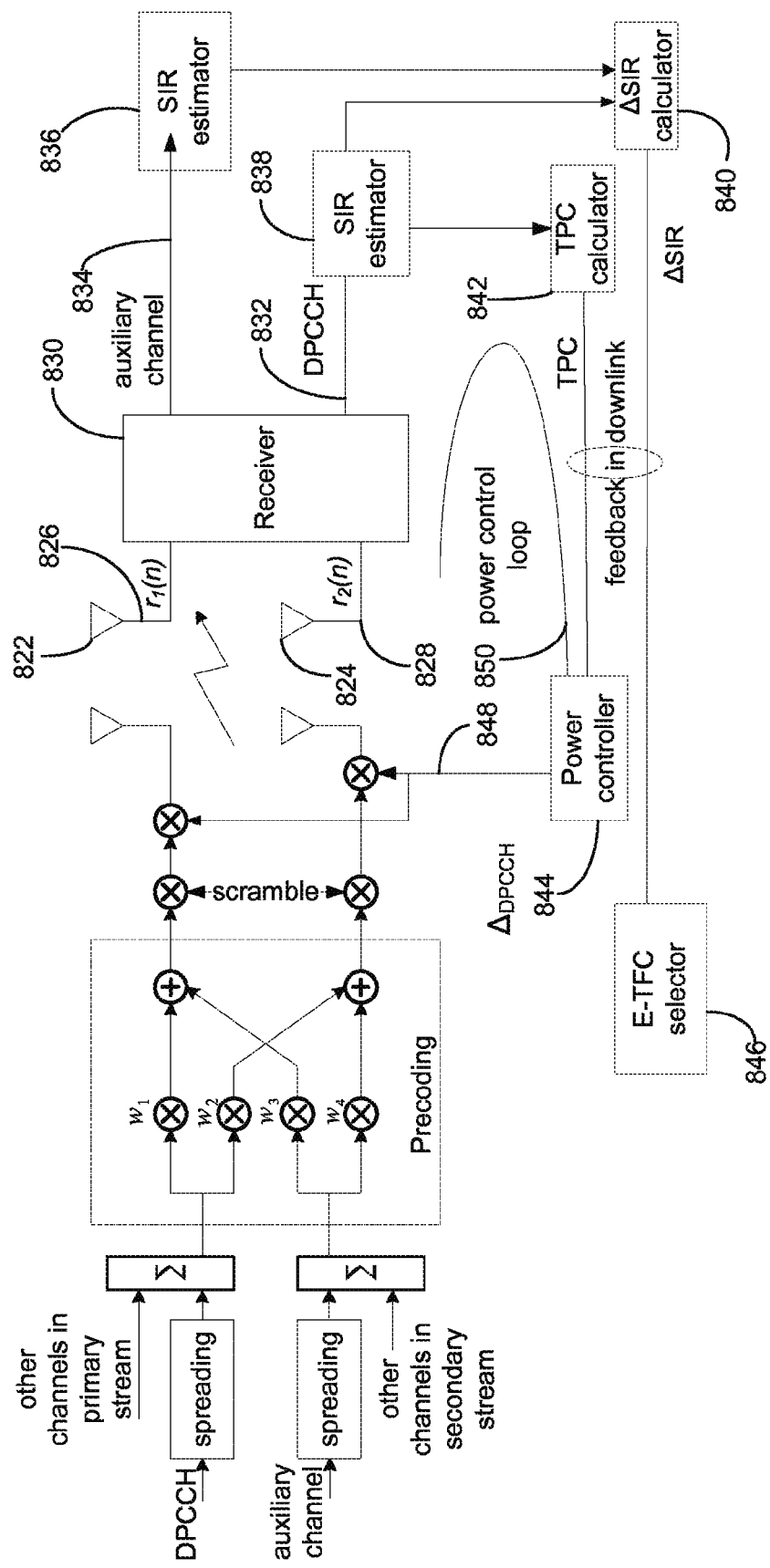
FIG. 8 illustrates an example power control when an UE is configured with uplink MIMO operations.

FIG. 8 illustrates an uplink MIMO scheme where a power control loop 850 may be applied to the primary control channel DPCCH, which may be assumed to be carried on the primary MIMO stream. The primary MIMO stream may also be assumed to be the stream with best channel quality. In an embodiment, power control loop 850 may be implemented in a manner similar to the procedure outlined with regards to FIG. 7. In this example, power control loop 850 may be used to control the transmit power of the primary and/or secondary streams.

As shown in FIG. 8, receiver 830 may include primary receiver input 826 which may be coupled to antenna 822. Receiver 830 may also include secondary receiver input 828 which may be coupled to antenna 824. The signal at primary receiver input 826 may be represented by $r_1(n)$. The signal at secondary receiver input 828 may be represented by $r_2(n)$. In an embodiment, the secondary MIMO stream may include the auxiliary channel. In an example, the auxiliary channel may be un-involved with the direct power control procedure. For example, the relative amplitudes of the two MIMO channels may vary in a wide range. In this scenario, if the secondary MIMO stream is too weak, the transmit power boost required to maintain a desired SIR target may be too high to control effectively. This may lead to significant impact on the serving grant control from the network. Another reason the secondary MIMO stream may not be directly involved with the power control procedure may be that adjusting the power of the auxiliary channel individually may affect the orthogonality of the primary and secondary pilot signals after the precoding. As such, channel estimation at the uplink receiver may become difficult. For example, the loss of orthogonality may affect a NodeB attempting to estimate the desired precoding weights.

As shown in FIG. 8, the transmit power of the auxiliary channel may be tied to the DPCCH which may be carried on the primary stream. Receiver 830 may output the received DPCCH on primary output 832. Receiver 830 may output the received auxiliary channel on secondary output 834. SIR estimator 838 may constantly calculate a SIR of the DPCCH channel. The SIR may be monitored in a per-timeslot or per-subframe basis. The SIR of the DPCCH may be compared with a predetermined target value. The predetermined target value may be configured, for example, by the RNC. A Transmit Power Control (TPC) may be generated by TPC calculator 842. TPC may be an up or down command for adjusting the UE transmit power to maintain a desired receiver quality on DPCCH. The UE may receive one or more TPC commands through the feedback channel in downlink, and may derive a power adjustment variable such as $\Delta_{DPCCH}$ as the control gain factor at power controller 844. Power controller 844 may be implemented in one or more components on the UE. As shown, power control, such as the control gain factor, may be included in output 848 of power controller 844 and may be applied simultaneously to the signals being transmitted on multiple antennas.

Implementing power control loop 850, as shown in FIG. 8, may allow the transmit power of the auxiliary channel to be tied to that of the DPCCH. The SIR of the secondary stream may be estimated and monitored on a regular basis, for example by using the auxiliary pilot channel given that the UE power may already be controlled. For example, Receiver 830 may include secondary output 834 which may include the auxiliary pilot channel. Secondary output 834 may be fed to SIR estimator 836, which may use the auxiliary pilot channel to estimate a SIR of the secondary stream. Based on the SIR of the primary stream estimated or calculated by SIR estimator 838 and the SIR of the secondary stream estimated or calculated by SIR estimator 836, a difference of the SIR of the two streams, $\Delta$SIR, may be determined by $\Delta$SIR calculator 840. For example, $\Delta$SIR may be calculated by the network on a per transmission time interval (TTI) or per time slot basis. As shown in FIG. 8, $\Delta$SIR may be fed back to the UE in the downlink. The difference in SIR of the secondary stream with reference to the primary stream may be utilized for the calculation of the power reference, and/or for E-TFC selection by E-TFC selector 846, and/or for other purposes related to transmission of the secondary stream. For example, $\Delta$SIR may be determined as:

$$\Delta SIR = SIR_{DPCCH} - SIR_{AUX} \quad \text{(Equation 22)}$$

where $SIR_{DPCCH}$ may be the Signal to Interference Ratio observed on the DPCCH at the receiver, and $SIR_{AUX}$ may be the Signal to Interference Ratio observed on the auxiliary channel at the receiver. For example, $SIR_{DPCCH}$, $SIR_{AUX}$, and/or $\Delta$SIR may be measured in dB. In an example embodiment, the receiver may be a Node B.

Figure 9:
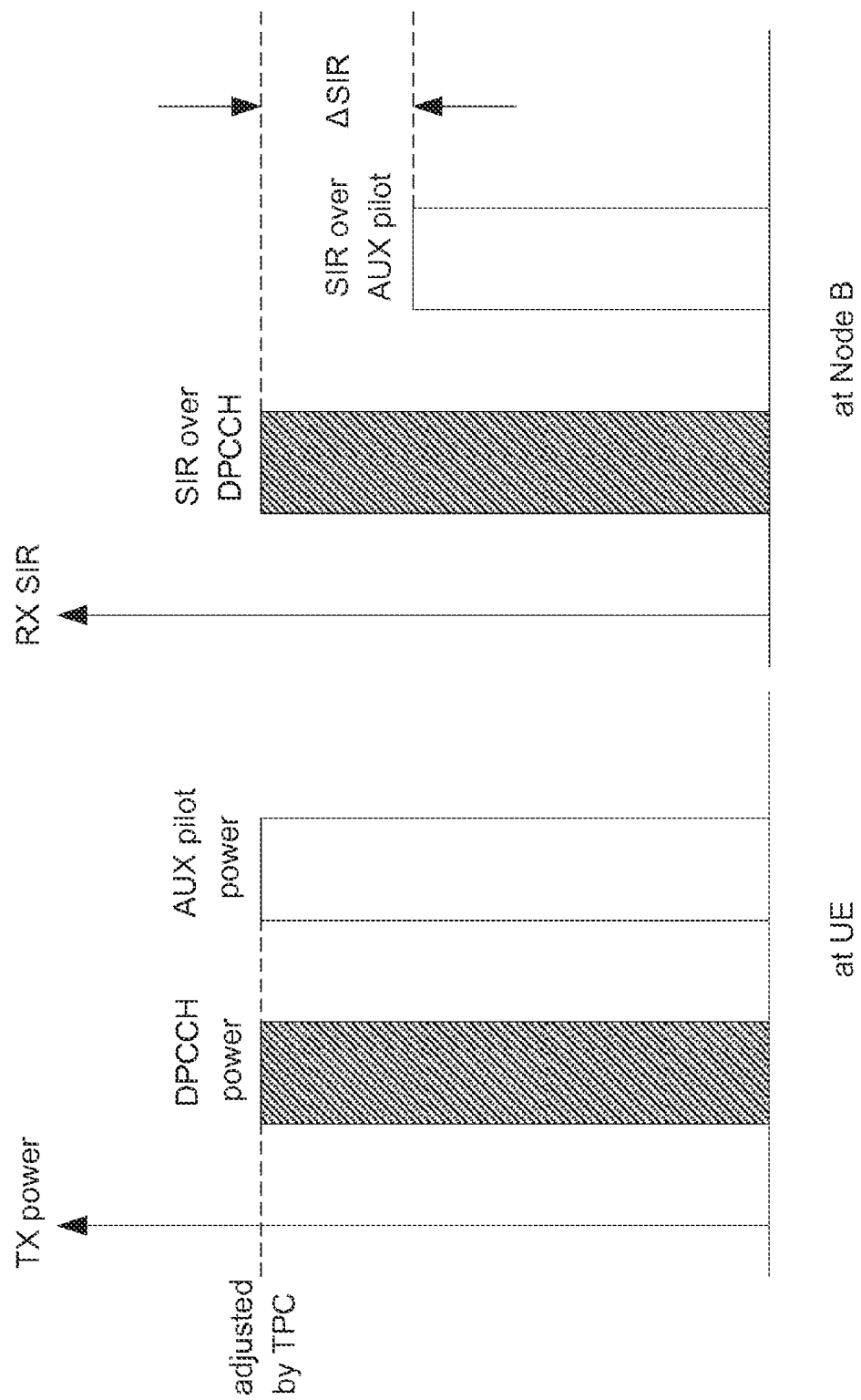
FIG. 9 illustrates a transmit power level at a transmitter and a signal-to-interference ratio (SIR) at a receiver.

FIG. 9 illustrates a graphical representation of the relationship between the DPCCH power level and the AUX channel power level at the UE (transmitter) and the relationship between the DPCCH SIR level and the AUX channel SIR level at the Node B (receiver). As shown in FIG. 9, the power levels at the transmitter may be adjusted by a TPC command. Due to differences in the channel characteristics, the SIR of the DPCCH, which may be associated with the primary stream, may be different than the SIR of the auxiliary channel, which may be associated with the secondary stream. The difference in the SIR of the DPCCH and the auxiliary channel may be represented as $\Delta$SIR.

There may be a number of methods to signal $\Delta$SIR to the UE from the network. For example, $\Delta$SIR may be sent via physical layer, or Layer 1 signaling. For example, a value for the $\Delta$SIR may be sent via the E-DCH Absolute Grant Channel (E-AGCH). In another example, $\Delta$SIR may be adjusted incrementally, for example in a signaling manner similar to a mechanism used'on the E-DCH Relative Grant Channel (E-RGCH). In another example, a new channel which may carry other information such as the weight vector associated with the primary stream may include information related to the $\Delta$SIR. In yet another example, the $\Delta$SIR information may be sent to the UE via a new Media Access Control (MAC)-layer message. As the SIR target is the performance metric used for the TPC command generation, the techniques described above may be referred to as a single inner loop power control (ILPC) system.

Figure 10:
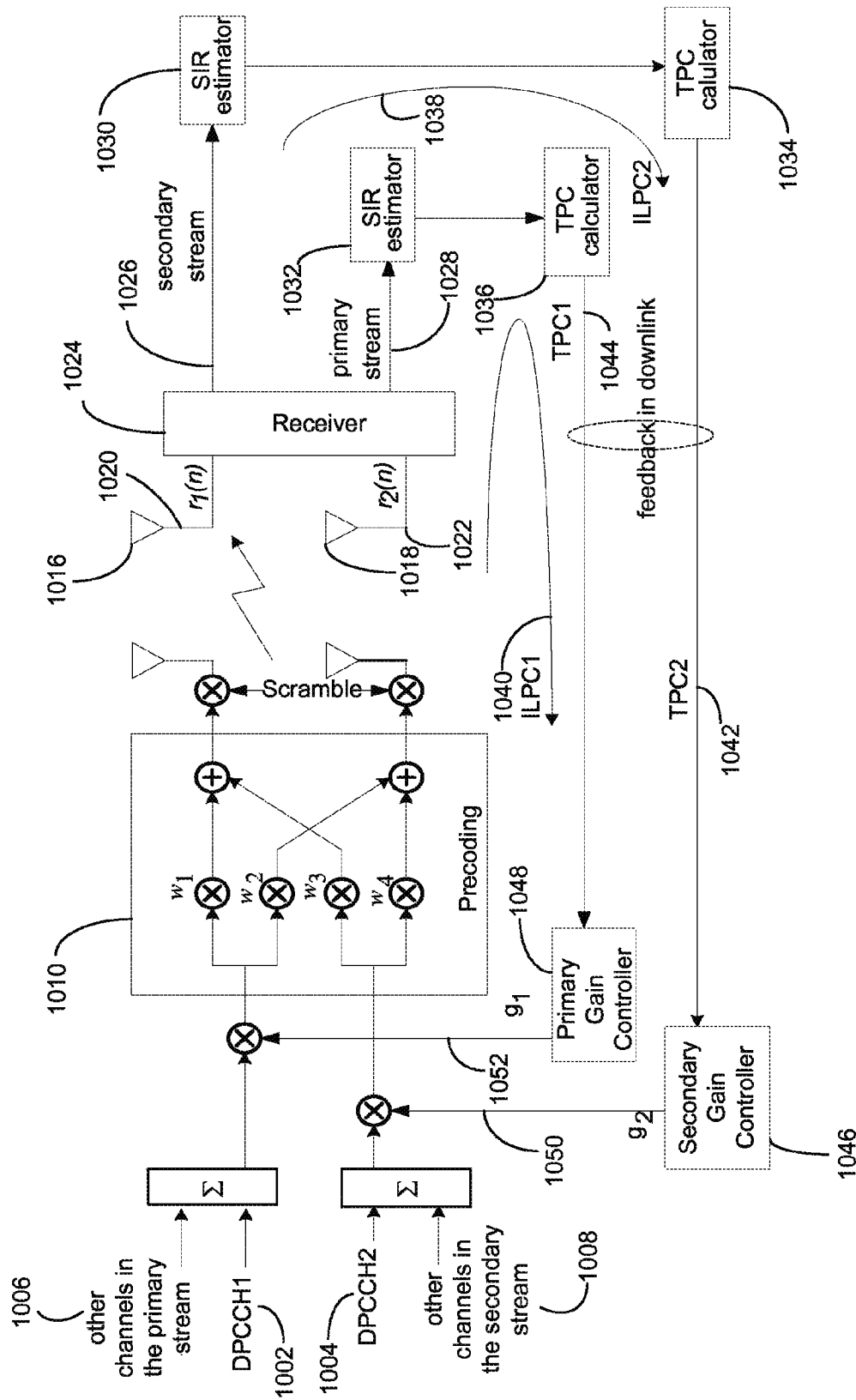
FIG. 10 illustrates an example uplink MIMO system with dual inner loop power control (ILPC)

With reference to FIG. 10, the inner power control procedure may be performed on each of the streams according to different SIR targets set on the two streams. Therefore two inner power control loops may be configured in order to Maintain desired SIRS for each stream individually. This may be referred to as dual inner loop power control (ILPC). The two power control loops may operate independently in response to their own effective channel conditions for the primary and secondary streams. As shown in FIG. 10, DPCCH1 1002 and other channels in primary stream 1006 may be a first input to precoder 1010. In an example embodiment, DPCCH2 1004 and other channels in secondary stream 1008 may be a second input to precoder 1010. In this embodiment, DPCCH2 1004 includes pilot information similar to the auxiliary channel described above, but may also include additional control information to be transmitted via the secondary stream. The DPCCH2 may also be referred to as the Secondary DPCCH (S-DPCCH). As can be appreciated, transmitting either a second DPCCH or the auxiliary channel via the secondary stream any be implemented in accordance with various embodiments, and references to DPCCH2 and the auxiliary pilot may be used interchangeably herein. In the example implementation shown in FIG. 10, DPCCH1 1006 may be transmitted via the primary stream and DPCCH2 1004 may be transmitted via the secondary stream.

As shown in FIG. 10, receiver 1024 may include primary receiver input 1020 which may be coupled to antenna 1016. Receiver 1024 may also include secondary receiver input 1022 which may be coupled to antenna 1018. The signal at primary receiver input 1020 may be represented by $r_1(n)$. The signal at secondary receiver input 1022 may be represented by $r_2(n)$. Receiver 1024 may include primary output 1028. Primary output 1028 may include the received DPCCH1 and/or other signals associated with the primary stream. SIR estimator 1032 may constantly calculate a SIR for the primary stream. For example, SIR estimator may calculate a SIR for the received DPCCH1. The SIR may be monitored in a per-timeslot or per-subframe basis. The SIR calculated by SIR estimator 1032 may be compared with a predetermined target value. The predetermined target value may be configured, for example, by the RNC.

Receiver 1024 may include secondary output 1026. Secondary output 1026 may include the received DPCCH2 and/or other signals associated with the secondary stream. SIR estimator 1030 may constantly calculate a SIR for the secondary stream. For example, SIR estimator may calculate a SIR for the received DPCCH2. The SIR may be monitored in a per-timeslot or per-subframe basis. The SIR calculated by SIR estimator 1030 may be compared with a predetermined target value. The predetermined target value may be configured, for example, by the RNC.

As a result, two independent sets of TPC commands, TPC1 and TPC2, may be separately generated at Node B receiver from different SIR estimation units. As shown in FIG. 10, TPC calculator 1036 may generate TPC I based on an SIR determined for the primary stream. For example, TPC1 may be generated based on the SIR of the received DPCCH1. Similarly, TPC calculator 1034 may generate TPC2 based on an SIR determined for the secondary stream. For example, TPC2 may be generated based on the SIR of the received DPCCH2. Though as an option the SIR targets for the two streams may be set identical by the network, two sets of TPC command may still be needed.

At the UE, upon receiving the TPC1 command and the TPC2 command in feedback from the downlink control channel, the transmit power of primary stream may be adjusted up or down as instructed by TPC1, and the transmit power of secondary stream may be adjusted up or down as instructed by TPC2. As shown in FIG. 10, TPC1 may be received by Primary Gain Controller 1048 as part of ILPC1 1040. TPC2 may be received by Secondary Gain Controller 1046 as part of ILPC2 1038. The gain control for adjusting the transmit power for both streams may be applied at a point before the precoding and scrambler, as it may be the place where the two streams may be distinguished. For example, the gain determined by Primary Gain Controller 1048 may be applied to the primary stream via output 1052. The gain determined by Secondary Gain Controller 1046 may be applied to the secondary stream via output 1050.

Figure 11:
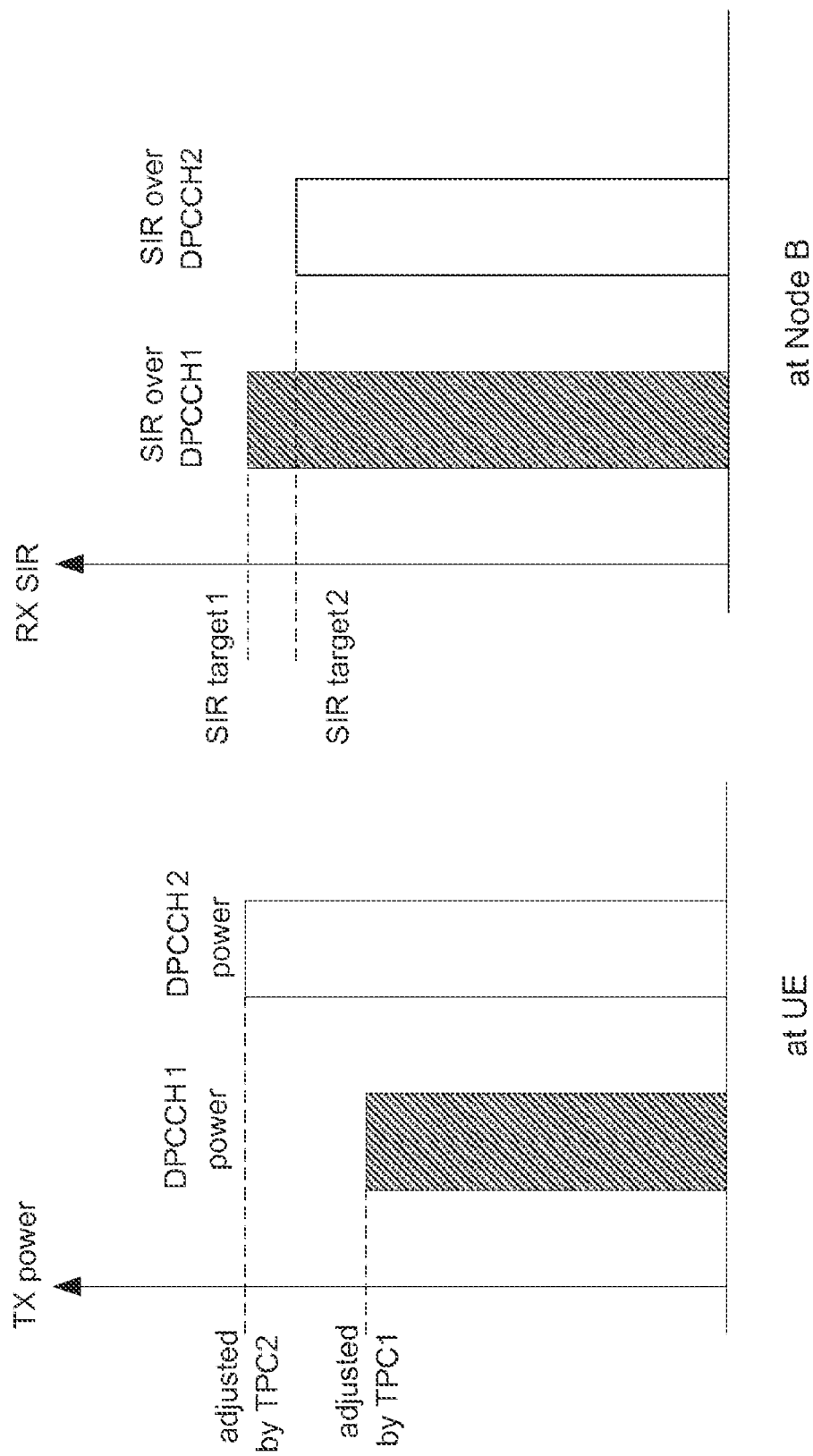
FIG. 11 illustrates a transmit power level at a transmitter and a signal-to-interference ratio (SIR) at a receiver during operation of ILPC.

FIG. 11 illustrates a graphical representation of the relationship between the DPCCH1 power level and the DPCCH2 power level at the UE (transmitter) and the relationship between the DPCCH1 SIR level and the DPCCH2 SIR level at the Node B (receiver) using the dual ILPC configuration. As shown in FIG. 11, the power level of DPCCH1 at the transmitter may be adjusted by a TPC1 command. The power level of DPCCH2 at the transmitter may be adjusted by a TPC2 command. Due to differences in the channel characteristics, the SIR of the DPCCH1, which may be associated with the primary stream, may be different than the SIR of DPCCH2, which may be associated with the secondary stream. The TPC1 command may be used to adjust the power level of the primary stream such that the received DPCCH1 SIR may meet a first SIR target. The TPC2 command may be used to adjust the power level of the secondary stream such that the received DPCCH2 SIR may meet a second SIR target.

An example advantage of dual ILPC configuration for power control is a simpler power reference procedure for other physical channels and less signaling overhead. However, the issue of potentially over-requested power due to weak stream conditions, as mentioned earlier, may need to be addressed. Without loss of generality, assuming that the Node B receiver can identify the stream with stronger reception and associates it to the primary stream, then the transmit power of the secondary stream needs to be monitored and controlled. In accordance with an embodiment, in order to avoid the situation that its transmit power is boosted too high to meet the SIR target due to ill-conditioned MIMO channels, the transmit power of the secondary stream may be limited to a cap. For example, if the gain factor that controls the transmit power of the secondary stream is $g_2$, the UE may be designed to ignore TPC2 if the feedback corresponds to an up command and $g_2$ exceeds a predetermined maximum. For example, the predetermined maximum may be a power threshold $g_{max}$. The power threshold may be set by the network at RRC configuration and/or may be set in a semi-static manner. The real transmitter power relation with the gain factor $g_2$ may be calibrated to make the power control meaningful across different UE implementations.

In another embodiment, the gain factor that controls the transmit power of the primary stream may be $g_1$. The ratio of the primary stream gain factor compared to the secondary stream gain factor may be defined as:

$$\eta = g_2/g_1 \quad \text{(Equation 23)}$$

For example, if it is determined at the UE that $\eta$ is greater than a maximum value ($\eta_{max}$), the UE may be designed to ignore TPC2. $\eta_{max}$ may be a pre-defined value or may be configured by the network at RRC connection.

In accordance with an embodiment, DPCCH2, which may be used in the SIR estimation for secondary stream at the Node B when other physical channels are not transmitting, may be purposely transmitted in a power backed off by a fixed amount of dBs. Thus, the Node B receiver may observe a lower SIR over DPCCH2. With full knowledge of the backoff at Node B, this difference may be corrected by applying a constant offset with same amount as the backoff to the SIR estimation result obtained over DPCCH2.

With reference to a single power control loop configuration, for example the configuration shown in FIG. 8, since the power control procedure provides means to ensure the SIR target for the primary stream and relies on a reference power level for control of the secondary stream, transmission quality of the secondary stream may need to be monitored at the Node B receiver for grant allocation and passed to the UE for data scheduling with the E-TFC selection procedure. The grant allocation information may be fed back to the UE in the form of a performance metric for the secondary MIMO stream. A metric measuring the relative quality of the secondary stream with reference to a primary pilot carried on the primary stream may be evaluated by calculating the power ratio of the primary pilot and a secondary pilot carried on the secondary stream at the Node B. For example, primary pilot information may be transmitted via a primary DPCCH (DPCCH1) on the primary stream and secondary pilot information may be transmitted via a secondary DPCCH (S-DPCCH or DPCCH2) on the secondary stream. As an example, $P_{pp}$ may represent the power of the primary pilot (or DPCCH1) and $P_{pa}$ may represent the power of the secondary pilot (or S-DPCCH or DPCCH2). The quality metric for the secondary stream may be defined as:

$$I_c = 10\log10\left(\frac{P_{pc}}{P_{pp}}\right) dB \quad \text{(Equation 24)}$$

The performance metric may be considered as a MIMO stream condition index which may provide rank information of the primary and secondary streams. In another embodiment, the total receiver power of the primary and secondary streams may be used in determining the quality metric. For example, $P_{tp}$ may represent the total received power of the primary stream and $P_{ta}$ may represent the total received power of the secondary stream. In this example the performance metric may be defined as $$I_c = 10\log10\left(\frac{P_{tp}}{P_{ta}}\right) dB \quad \text{(Equation 25)}$$

As another example, the $\Delta$SIR, which may be defined as the difference of the SIRs (or SINRs) between the two stream as was described above, may be used as the quality metric. Regardless of the chosen performance metric, the metric may be expressed in a linear scale or in decibels. Alternatively, the performance metric may be expressed in a square-root linear scale in order to relate to the scaling operation.

Due to the dynamic nature of channel conditions, it may be desirable to feed back the quality metric to the UE via Layer 1 signaling on a fast updating basis. The E-AGCH and the E-RGCH are control channels which may be used for fast grant scheduling for HUSPA uplink data transmission. In order to reduce control signal overhead, the E-AGCH and/or the E-RGCH structures may be reused to pass the quality metric information to the UE.

For example, the E-AGCH, or a channel with an encoding similar to the E-AGCH, may be capable of encoding five information bits. A 32-entry look-up table may be designed and made available at both the UE and Node B. The five-bit information feedback may be received by the UE via the E-AGCH and used as an index to the look-up table to determine a value for the quality metric being reported by the Node B. The table may be designed with incremental entries with a step of 1 dB and/or fractions of dBs. An example design for the look-up table is shown in Table 1, below. In this example, the average increment may be set to about 1 dB for consecutive entries.

TABLE 1

Lookup Table for E-AGCH

| metric value | index | in dB | difference in dB |
|---|---|---|---|
| $(95/15)^2$ | 31 | 16.0326 | 0.9517 |
| $(84/15)^2$ | 30 | 14.9638 | 1.0688 |
| $(75/15)^2$ | 29 | 13.9794 | 0.9844 |
| $(67/15)^2$ | 28 | 12.9997 | 0.9797 |
| $(60/15)^2$ | 27 | 12.0412 | 0.9585 |
| $(53/15)^2$ | 26 | 10.9637 | 1.0775 |
| $(47/15)^2$ | 25 | 9.9201 | 1.0436 |
| $(42/15)^2$ | 24 | 8.9432 | 0.9769 |
| $(38/15)^2$ | 23 | 8.0738 | 0.8694 |
| $(34/15)^2$ | 22 | 7.1078 | 0.966 |
| $(30/15)^2$ | 21 | 6.0206 | 1.0872 |
| $(27/15)^2$ | 20 | 5.1055 | 0.9151 |
| $(24/15)^2$ | 19 | 4.0824 | 1.0231 |
| $(19/15)^2$ | 18 | 2.0532 | 2.0292 |
| $(17/15)^2$ | 17 | 1.0872 | 0.966 |
| $(15/15)^2$ | 16 | 0 | 1.0872 |
| $(27/30)^2$ | 15 | −0.9151 | 0.9151 |
| $(24/30)^2$ | 14 | −1.9382 | 1.0231 |
| $(21/30)^2$ | 13 | −3.098 | 1.1598 |
| $(19/30)^2$ | 12 | −3.9674 | 0.8694 |
| $(17/30)^2$ | 11 | −4.9334 | 0.966 |
| $(15/30)^2$ | 10 | −6.0206 | 1.0872 |
| $(27/60)^2$ | 9 | −6.9357 | 0.9151 |
| $(24/60)^2$ | 8 | −7.9588 | 1.0231 |
| $(21/60)^2$ | 7 | −9.1186 | 1.1598 |
| $(19/60)^2$ | 6 | −9.988 | 0.8694 |
| $(17/60)^2$ | 5 | −10.954 | 0.966 |
| $(15/60)^2$ | 4 | 12.0412 | 1.0872 |
| $(27/120)^2$ | 3 | 12.9563 | 0.9151 |
| $(24/120)^2$ | 2 | 13.9794 | 1.0231 |
| $(21/120)^2$ | 1 | 15.1392 | 1.1598 |
| $(19/120)^2$ | 0 | 16.0086 | 0.8694 |

In another example embodiment, fewer information bits in the E-AGCH may be used with only a subset of the metric values shown in Table 1. For example, if three bits are used, an eight entry table may be generated, for example from the middle range of Table 1.

The E-AGCH may be typically used for infrequent configuration as the channel may use a sizable signaling overhead. Fast updating of the quality metric may also be achieved using the E-RGCH, which may utilize UP, DOWN, and/or HOLD commands to signal value changes to the UE. Upon receiving the commands carried by the E-RGCH, the UE may move up one entry if an UP command is received. The UE may move down one entry if a DOWN command is received. The UE may use the same entry as the previous command if a HOLD command is received. In order to allow for a wider range of control, an example table with a larger magnitude range than Table 1 may be defined. An example table is shown in Table 2.

TABLE 2

Lookup Table for E-RGCH

| metric value | index | in dB | difference in dB |
|---|---|---|---|
| $(150/15)^2$ | 37 | 20 | |
| $(134/15)^2$ | 36 | 19.0203 | 0.9797 |
| $(119/15)^2$ | 35 | 17.9891 | 1.0312 |
| $(106/15)^2$ | 34 | 16.9843 | 1.0048 |
| $(95/15)^2$ | 33 | 16.0326 | 0.9517 |
| $(84/15)^2$ | 32 | 14.9638 | 1.0688 |
| $(75/15)^2$ | 31 | 13.9794 | 0.9844 |
| $(67/15)^2$ | 30 | 12.9997 | 0.9797 |
| $(60/15)^2$ | 29 | 12.0412 | 0.9585 |
| $(53/15)^2$ | 28 | 10.9637 | 1.0775 |
| $(47/15)^2$ | 27 | 9.9201 | 1.0436 |
| $(42/15)^2$ | 26 | 8.9432 | 0.9769 |
| $(38/15)^2$ | 25 | 8.0738 | 0.8694 |
| $(34/15)^2$ | 24 | 7.1078 | 0.966 |
| $(30/15)^2$ | 23 | 6.0206 | 1.0872 |
| $(27/15)^2$ | 22 | 5.1055 | 0.9151 |
| $(24/15)^2$ | 21 | 4.0824 | 1.0231 |
| $(19/15)^2$ | 20 | 2.0532 | 2.0292 |
| $(17/15)^2$ | 19 | 1.0872 | 0.966 |
| $(15/15)^2$ | 18 | 0 | 1.0872 |
| $(27/30)^2$ | 17 | −0.9151 | 0.9151 |
| $(24/30)^2$ | 16 | −1.9382 | 1.0231 |
| $(21/30)^2$ | 15 | −3.098 | 1.1598 |
| $(19/30)^2$ | 14 | −3.9674 | 0.8694 |
| $(17/30)^2$ | 13 | −4.9334 | 0.966 |
| $(15/30)^2$ | 12 | −6.0206 | 1.0872 |
| $(27/60)^2$ | 11 | −6.9357 | 0.9151 |
| $(24/60)^2$ | 10 | −7.9588 | 1.0231 |
| $(21/60)^2$ | 9 | −9.1186 | 1.1598 |
| $(19/60)^2$ | 8 | −9.988 | 0.8694 |
| $(17/60)^2$ | 7 | −10.954 | 0.966 |
| $(15/60)^2$ | 6 | 12.0412 | 1.0872 |
| $(27/120)^2$ | 5 | 12.9563 | 0.9151 |
| $(24/120)^2$ | 4 | 13.9794 | 1.0231 |
| $(21/120)^2$ | 3 | 15.1392 | 1.1598 |
| $(19/120)^2$ | 2 | 16.0086 | 0.8694 |
| $(17/120)^2$ | 1 | 16.9746 | 0.966 |
| $(15/120)^2$ | 0 | 18.0618 | 1.0872 |

Alternatively, the Table 1 and Table 2 may be modified such that the increment for each level is approximately 0.5 dB rather than 1 dB. The alternative E-AGCH table is shown in Table 3, and the alternative E-RGCH table is shown in Table 4.

TABLE 3

Alternative lookup Table for E-AGCH

| metric value | index | in dB | difference in dB |
|---|---|---|---|
| $(30/15)^2$ | 31 | 6.0206 | |
| $(28/15)^2$ | 30 | 5.4213 | 0.5993 |
| $(60/30)^2$ | 29 | 6.0206 | −0.5993 |
| $(57/30)^2$ | 28 | 5.5751 | 0.4455 |
| $(54/30)^2$ | 27 | 5.1055 | 0.4696 |
| $(51/30)^2$ | 26 | 4.609 | 0.4965 |
| $(48/30)^2$ | 25 | 4.0824 | 0.5266 |
| $(45/30)^2$ | 24 | 3.5218 | 0.5606 |
| $(42/30)^2$ | 23 | 2.9226 | 0.5992 |
| $(40/30)^2$ | 22 | 2.4988 | 0.4238 |
| $(38/30)^2$ | 21 | 2.0532 | 0.4456 |
| $(36/30)^2$ | 20 | 1.5836 | 0.4696 |
| $(34/30)^2$ | 19 | 1.0872 | 0.4964 |
| $(32/30)^2$ | 18 | 0.5606 | 0.5266 |
| $(30/30)^2$ | 17 | 0 | 0.5606 |
| $(28/30)^2$ | 16 | −0.5993 | 0.5993 |
| $(60/60)^2$ | 15 | 0 | −0.5993 |
| $(57/60)^2$ | 14 | −0.4455 | 0.4455 |
| $(54/60)^2$ | 13 | −0.9151 | 0.4696 |
| $(51/60)^2$ | 12 | −1.4116 | 0.4965 |

TABLE 3-continued

Alternative lookup Table for E-AGCH

| metric value | index | in dB | difference in dB |
|---|---|---|---|
| $(48/60)\hat{\ }2$ | 11 | −1.9382 | 0.5266 |
| $(45/60)\hat{\ }2$ | 10 | −2.4988 | 0.5606 |
| $(42/60)\hat{\ }2$ | 9 | −3.098 | 0.5992 |
| $(40/60)\hat{\ }2$ | 8 | −3.5218 | 0.4238 |
| $(38/60)\hat{\ }2$ | 7 | −3.9674 | 0.4456 |
| $(36/60)\hat{\ }2$ | 6 | −4.437 | 0.4696 |
| $(34/60)\hat{\ }2$ | 5 | −4.9334 | 0.4964 |
| $(32/60)\hat{\ }2$ | 4 | −5.46 | 0.5266 |
| $(30/60)\hat{\ }2$ | 3 | −6.0206 | 0.5606 |
| $(28/60)\hat{\ }2$ | 2 | −6.6199 | 0.5993 |
| $(60/120)\hat{\ }2$ | 1 | −6.0206 | −0.5993 |
| $(57/120)\hat{\ }2$ | 0 | −6.4661 | 0.4455 |

TABLE 4

Alternative lookup Table for E-RGCH

| metric value | index | in dB | difference in dB |
|---|---|---|---|
| $(38/15)\hat{\ }2$ | 37 | 8.0738 | |
| $(36/15)\hat{\ }2$ | 36 | 7.6042 | 0.4696 |
| $(34/15)\hat{\ }2$ | 35 | 7.1078 | 0.4964 |
| $(32/15)\hat{\ }2$ | 34 | 6.5812 | 0.5266 |
| $(30/15)\hat{\ }2$ | 33 | 6.0206 | 0.5606 |
| $(28/15)\hat{\ }2$ | 32 | 5.4213 | 0.5993 |
| $(60/30)\hat{\ }2$ | 31 | 6.0206 | −0.5993 |
| $(57/30)\hat{\ }2$ | 30 | 5.5751 | 0.4455 |
| $(54/30)\hat{\ }2$ | 29 | 5.1055 | 0.4696 |
| $(51/30)\hat{\ }2$ | 28 | 4.609 | 0.4965 |
| $(48/30)\hat{\ }2$ | 27 | 4.0824 | 0.5266 |
| $(45/30)\hat{\ }2$ | 26 | 3.5218 | 0.5606 |
| $(42/30)\hat{\ }2$ | 25 | 2.9226 | 0.5992 |
| $(40/30)\hat{\ }2$ | 24 | 2.4988 | 0.4238 |
| $(38/30)\hat{\ }2$ | 23 | 2.0532 | 0.4456 |
| $(36/30)\hat{\ }2$ | 22 | 1.5836 | 0.4696 |
| $(34/30)\hat{\ }2$ | 21 | 1.0872 | 0.4964 |
| $(32/30)\hat{\ }2$ | 20 | 0.5606 | 0.5266 |
| $(30/30)\hat{\ }2$ | 19 | 0 | 0.5606 |
| $(28/30)\hat{\ }2$ | 18 | −0.5993 | 0.5993 |
| $(60/60)\hat{\ }2$ | 17 | 0 | −0.5993 |
| $(57/60)\hat{\ }2$ | 16 | −0.4455 | 0.4455 |
| $(54/60)\hat{\ }2$ | 15 | −0.9151 | 0.4696 |
| $(51/60)\hat{\ }2$ | 14 | −1.4116 | 0.4965 |
| $(48/60)\hat{\ }2$ | 13 | −1.9382 | 0.5266 |
| $(45/60)\hat{\ }2$ | 12 | −2.4988 | 0.5606 |
| $(42/60)\hat{\ }2$ | 11 | −3.098 | 0.5992 |
| $(40/60)\hat{\ }2$ | 10 | −3.5218 | 0.4238 |
| $(38/60)\hat{\ }2$ | 9 | −3.9674 | 0.4456 |
| $(36/60)\hat{\ }2$ | 8 | −4.437 | 0.4696 |
| $(34/60)\hat{\ }2$ | 7 | −4.9334 | 0.4964 |
| $(32/60)\hat{\ }2$ | 6 | −5.46 | 0.5266 |
| $(30/60)\hat{\ }2$ | 5 | −6.0206 | 0.5606 |
| $(28/60)\hat{\ }2$ | 4 | −6.6199 | 0.5993 |
| $(60/120)\hat{\ }2$ | 3 | −6.0206 | −0.5993 |
| $(57/120)\hat{\ }2$ | 2 | −6.4661 | 0.4455 |
| $(54/120)\hat{\ }2$ | 1 | −6.9357 | 0.4696 |
| $(51/120)\hat{\ }2$ | 0 | −7.4322 | 0.4965 |

Tables 1, 2, 3, and 4 are not meant to be exhaustive, and numerous possible combinations may be implemented, for example, based on a desired table size and/or incremental step value. In an example embodiment, an incremental look-up table with a linear scale may be implemented, and the granularity of the table may be specified. In another example, the entries in the tables may be non-linear. In order to distinguish the E-AGCH and E-RGCH used for transmitting the power control metric from previous uses of the respective channels, a new or different E-DCH Radio Network Temporary Identifier (E-RNTI) may be assigned to the quality metric reporting process and/or a different hopping pattern transmitted across multiple slots may be applied.

Another example technique for realizing fast updating of the quality metric at the UE may be to use a TPC-like command carried in the fractional dedicated physical channel (F-DPCH). For example, a TPC command equal to 1 may be used for an UP command. Similarly, a TPC command equal to −1 may be used for a DOWN command. If the UE receives an UP command it may move up one entry in, for example, Table 2 or Table 4. If the UE receives a DOWN command it may move down one entry in, for example, Table 2 or Table 4. In yet another embodiment, the UE may store the quality metric from a previous period and adjust the metric based on a calculation. For example, The change in the quality metric (Δl) may be defined as:

$$\Delta l_c = \Delta_c \times TPC\_cmd \qquad \text{(Equation 26)}$$

where $\Delta_c$ may be the step size.

In an embodiment, the power reference for the primary MIMO stream may be calculated via a gain factor. As described above, the SIR of DPCCH over the primary stream may be managed by a single power control loop. The power settings of other physical channels in the same stream path may be based on the gain factor of DPCCH ($\beta_c$), for example, in accordance with procedures specified in 3GPP TS 25.214 v9.0.0, "Physical layer procedures (FDD)." For example, when E-TFCI≤E-TFCI$_{ec,boost}$, where E-TFCI$_{ec,boost}$ is signaled by higher layers, the gain factor for the E-DPCCH may be:

$$\mu_{ec} = \beta_c \cdot A_{ec} \qquad \text{(Equation 27)}$$

For example, $\beta_c$ may be signaled by a higher layer to the UE or may be computed. $A_{ec}$ may be a ratio derived from the parameter $\Delta_{E-DPCCH}$ that may be signaled by a higher layer.

In an example embodiment, the power reference, such as the power required to transmit E-DCH control and data on the secondary MIMO stream, may be calculated based on a power offset. For example, when the UE is configured in MIMO mode with dual-stream transmission, the secondary data stream may not be directly related to real-time power of the DPCCH, as the MIMO propagation channel conditions may vary rapidly over time and the power control loop operation may be implemented on the primary MIMO stream. To provide power reference on the secondary MIMO stream, a power offset may be used by the UE for the purpose of calculating the power required to transmit E-DCH control and data on the secondary MIMO stream. For example, the power offset may represent the difference in the received SIR between the two MIMO streams at the NodeB, such as the ΔSIR described above. In other examples, different power offsets representing different quantities may be used to calculate the power reference for the secondary MIMO stream. The UE may receive the value of the power offset, for example ΔSIR, from the network using any of the method described above.

In an embodiment, the power reference for the secondary MIMO stream may be generated based on the power of the DPCCH transmitted on the primary MIMO stream scaled by an offset calculated by the power offset ΔSIR. More specifically, the gain factor reference for the secondary MIMO stream such as $\beta_c'$ may be calculated as follows:

$$\beta_c' = \beta_c \cdot 10^{\Delta SIR/20} \qquad \text{(Equation 28)}$$

where $\beta_c$ may be the gain factor of the DPCCH that may be transmitted on the primary MIMO stream. Based on the new power reference parameter, the gain factor for other channels, for example E-DPCCH2 and E-DPDCH2, that may be transmitted on the secondary MIMO stream may be calculated as follows:

$$E\text{-}DPCCH2: \beta'_{ec} = \beta'_c \cdot A_{ec} \quad \text{(Equation 29)}$$

$$E\text{-}DPDCH2: \beta'_{ed2,ref}\beta'_c \cdot A_{ed} \quad \text{(Equation 30)}$$

$$\beta'_{ed,j,harq} = \beta'_{ed2,ref} \sqrt{\frac{L_{e2,ref}}{L_{e2,j}}} \sqrt{\frac{K_{e2,j}}{K_{e2,ref}}} \cdot 10^{\left(\frac{\Delta_{harq}}{20}\right)} \quad \text{(Equation 31)}$$

where $\Delta_{harq}$ may be the HARQ offset, $A_{ec}$ may be a relative power ratio for E-DPCCH, $A_{ed}$ may be a relative power ratio for E-DPDCH, $L_{e2,ref}$ may be a number of E-DPDCHs used in reference, and $K_{e2,ref}$ may be a number of data bits used in reference, for example as defined specified in 3GPP TS 25.213 v9.0.0 "spreading and modulation (FDD)." $L_{e2,j}$ may be the actual number of E-DPCCHs used in jth E-TFC, and $K_{e2,j}$ may be the number of data bits used in jth E-TFC. Thus, the gain factor, $\beta'_{ed2,ref}$, may be used to scale the data based on the amount of data that may be scheduled for transmission. The amount of data scheduled for transmission may depend on the HARQ offset.

Figure 12:
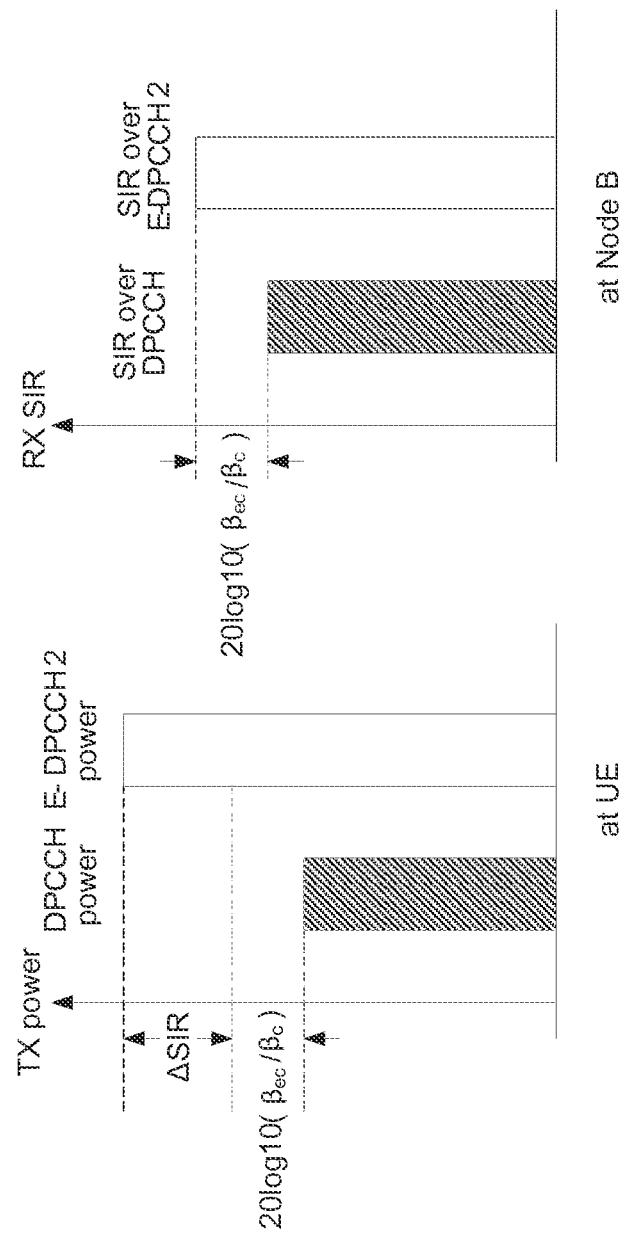
FIG. 12 illustrates an example of the power reference for a Enhanced Dedicated Channel (E-DCH) Dedicated Physical Control Channel (E-DPCCH) on a secondary stream.

To illustrate the power reference procedure, FIG. 12 shows an example for E-DPCCH2. According to $A_{ec}=\beta_{ec}/\beta_c$ that is already configured by the network, the transmit power of E-DPCCH2 can be set higher by amount of the power offset because it may need to compensate for the effective radio channel difference on the two streams. At the Node B receiver, the desired SIR target on E-DPCCH2 may then be achieved.

During the compressed frame, or in other situations where the gain factor setting is more complicated, the power reference set by Equation 28 may be applied by replacing $\beta_c$ with $\beta_c'$ in setting various beta factors as specified in 3GPP TS 25.214 v9.0.0, "Physical layer procedures (FDD)." Power scaling and E-TFC restriction rules as specified in 3GPP TS 25.214 v9.0.0, "Physical layer procedures (FDD)" and 3GPP TS 25.133 v9.0.0, "Requirements for support of radio resource management" may also apply. With the gain factors being determined for each of the physical channels carried in the secondary MIMO stream, the total transmit power on the secondary stream, such as P', may be calculated as follows:

$$P' = P'_{DPCCH} + P'_{DPDCH} + P'_{E\text{-}DPCCH} + P'_{E\text{-}DPDCH} \quad \text{(Equation 32)}$$

$$= P'_{DPCCH}\left(1 + \frac{\beta_d'^2 + \beta_{ec}'^2 + \beta_{ed}'^2}{\beta_c'^2}\right)$$

$$= P_{DPCCH}\left(1 + \frac{\beta_d'^2 + \beta_{ec}'^2 + \beta_{ed}'^2}{\beta_c'^2}\right) \times 10^{\Delta SIR/10}$$

where $P_{DPCCH}$ may be the transmit power of DPCCH on the primary stream, and $\beta_d'$ may be the gain factor of DPDCH on the secondary stream. $\beta_d'$ may be calculated as follows:

$$\beta_d' = \beta_d \cdot 10^{\Delta SIR/20} \quad \text{(Equation 33)}$$

with $\beta_d$ being the gain factor of DPDCH on the primary channel. In an embodiment, HS-DPCCH may not be included in the above calculation, as HS-DPCCH may not be transmitted on the secondary stream.

In another embodiment, the gain factors on the secondary MIMO stream may be calculated based on one or more serving grants for the UE. The gain factor of DPCCH channel, $\beta_c$, may be applied as the power reference for the secondary MIMO channel. The associated serving grant for E-DPDCH may be adjusted as follows:

$$SG' = SG/10^{\Delta SIR/20} \quad \text{(Equation 34)}$$

where SG may be the serving grant for the UE. When used in the E-TFC selection calculations as described above and as specified in 3GPP TS 25.321 v9.0.0, "Medium access control (MAC) protocol specification," the extrapolation formula may be configured as:

$$\left[K_{e,ref,m} \cdot \frac{SG'}{L_{e,ref,m} \cdot A_{ed,m}^2 \cdot 10^{\Delta harq/10}}\right] \quad \text{(Equation 35)}$$

where $A_{ed,m}$ may be the quantized amplitude ratio for the mth reference E-TFC, $L_{e,ref,m}$ may be the number of E-DPDCHs used for the mth reference E-TFC, and $K_{e,ref,m}$ may be the transport block size of the mth reference E-TFC. The interpolation formula may be configured as:

$$\left[K_{e,ref,m} + \frac{\left(\frac{SG'}{10^{\Delta harq/10}} - L_{e,ref,m} \cdot A_{ed,m}^2\right)}{L_{e,ref,m+1} \cdot A_{ed,m+1}^2 - L_{e,ref,m} \cdot A_{ed,m}^2} (K_{e,ref,m+1} - K_{e,ref,m})\right] \quad \text{(Equation 36)}$$

where variables including a "m+1" subscript may correspond to parameters associated with the (m+1)th reference E-TFC or the secondary reference E-TFC.

In another embodiment, the gain factors on the secondary MIMO stream may be calculated based on one or more gain offset values for each channel. For example, the UE may modify the gain offset values such as HARQ and/or T2TP that may be signaled by the network for each channel. For example, the gain offset parameters may be modified as follows:

$$\Delta'_{harq} = \Delta_{harq} + \Delta SIR(dB) \quad \text{(Equation 37)}$$

$$\Delta'_{T2TP} = \Delta_{T2TP} + \Delta SIR(dB) \quad \text{(Equation 38)}$$

In another embodiment, the reference power for the secondary MIMO stream may be based on a fixed relation with respect to the power of the DPCCH transmitted on the primary MIMO stream. For example, the gain factor reference for the secondary MIMO stream may be determined as follows:

$$\beta_c' = \beta_c \cdot \beta_a \quad \text{(Equation 39)}$$

where $\beta_a$ may be a fixed gain factor pre-defined or pre-configured by the network, for example by the RRC configuration. For example, when $\beta_a = 1$, equal power may be assumed in the primary and secondary streams. As a result, E-DPCCH2 and/or E-DPDCH2, or any other physical channels that may be transmitted on the secondary MIMO stream, may be set individually based on $\beta_c'$. For example, the gain factors may be calculated in a manner similar to the one described with reference to Equations 29 and 30, above, or other similar procedures described herein.

Figure 13:
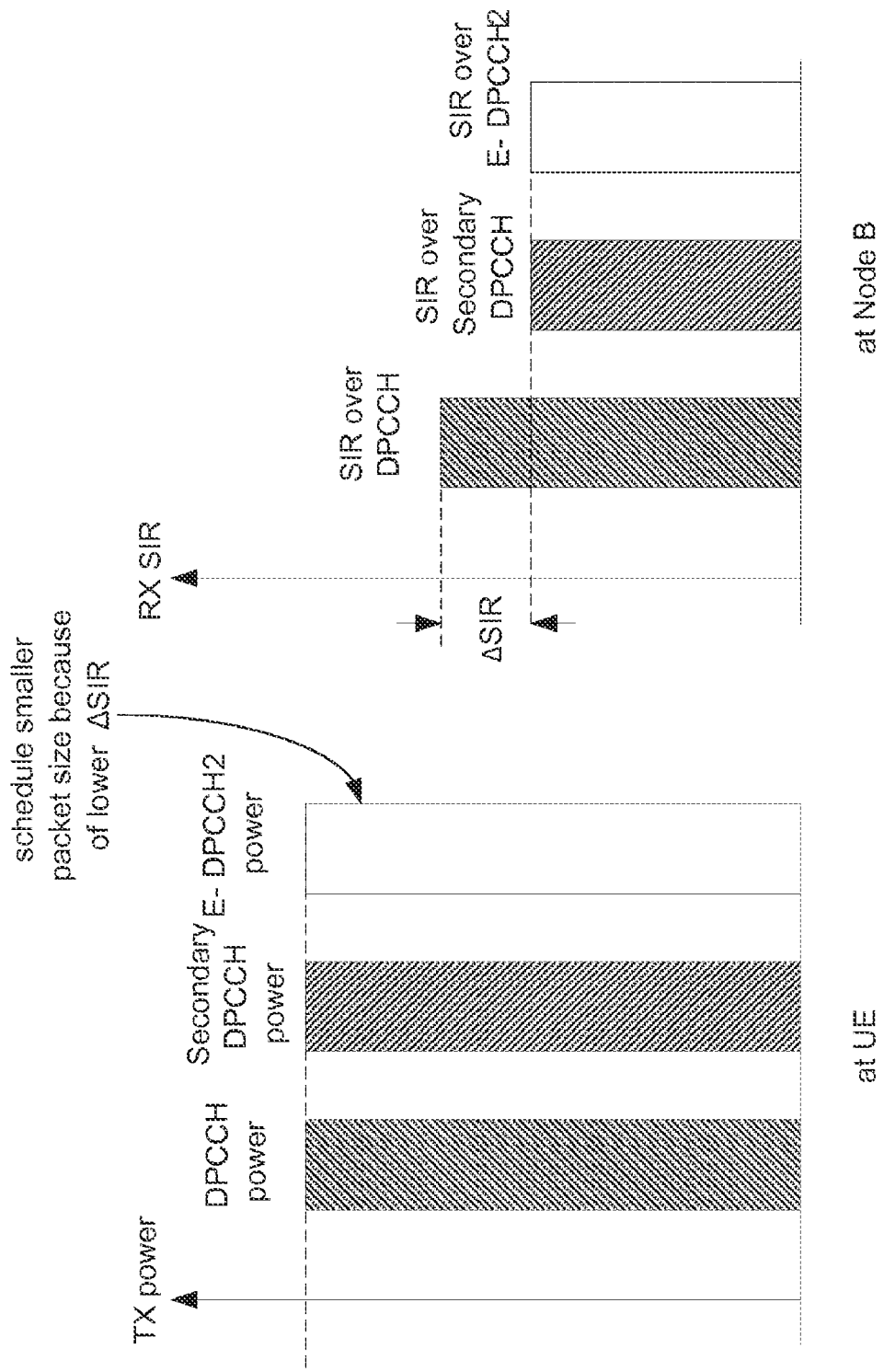
FIG. 13 illustrates an example of the equal power reference concept for the secondary stream.

Since the power of the secondary stream may be adjusted indirectly according to the corresponding MIMO channel conditions, the transmission quality of the secondary stream may be deemed unreliable following the conventional data scheduling procedure. For example, this issue may be resolved by incorporating the quality metric introduced above into the E-TFC selection procedure to determine an appropriate data packet size allocated to the secondary data stream. This concept is illustrated in FIG. 13, where equal power for all physical channels is assumed for simplicity of presentation.

As can be appreciated, in each of the power reference methods for the secondary stream described above, ΔSIR may be replace by the more general quality metric $1_c$. The more general quality metric may indicate the signal quality, or MIMO condition number, of the secondary MIMO stream.

In another embodiment, the relative power for the other physical channels, for example, E-DPCCH and/or E-DPDCH, may be set using the dual ILPCs operating independently for the primary and secondary streams, for example using the design shown in FIG. 10. The network may configure two sets of power reference parameters for the two streams such that for the primary stream $\beta_{c1}$ may be a gain factor for DPCCH, $A_{ec1}$ may be a relative power ratio for E-DPCCH, $A_{ed1}$ may be a relative power ratio for E-DPDCH, $L_{e,ref1}$ may be a number of E-DPDCHs used in reference, and $K_{e,ref1}$ may be number of data bits used in reference. For the secondary stream, $\beta_{c2}$ may be a gain factor for DPCCH, $A_{ec2}$ may be a relative power ratio for E-DPCCH, $A_{ed2}$ may be a relative power ratio for E-DPDCH, $L_{e,ref2}$ may be a number of E-DPDCHs used in reference, and $K_{e,ref2}$ may be a number of data bits used in reference. Since the two power control loops may run independently, the power reference setting for the physical channels carried in the two streams may be set separately without interaction to each other.

If E-DPCCH1 and E-DPCCH2 are denoted as the E-DPCCH channels carried over the primary and secondary streams, respectively, the gain factors may be calculated as follows:

E-DPCCH1: $\beta_{ec1} = A_{ec1} \cdot \beta_{c1}$ (Equation 40)

E-DPCCH2: $\beta_{ec2} = A_{ec2} \cdot \beta_{c2}$ (Equation 41)

With similar definition on E-DPDCH1 and E-DPDPCH2, the reference power settings for the E-DPDCH channels can be calculated as follows:

E-DPCDH1: $\beta_{ed,ref1} = A_{ed1} \cdot \beta_{c1}$ (Equation 42)

E-DPCDH2: $\beta_{ed,ref2} = A_{ed2} \cdot \beta_{c2}$ (Equation 43)

Considering that the E-TFC selection procedure may be performed to decide the transport block sizes to be transmitted over the primary and secondary streams respectively, the gain factors applied to j:th E-TFC can be determined as follows:

$$E\text{-}DPDCH1: \beta_{ed1,j,harq} = \beta_{ed1,ref} \sqrt{\frac{L_{e1,ref}}{L_{e1,j}}} \sqrt{\frac{K_{e1,j}}{K_{e1,ref}}} \cdot 10^{\left(\frac{\Delta_{harq}}{20}\right)}$$ (Equation 44)

$$E\text{-}DPDCH2: \beta_{ed2,j,harq} = \beta_{ed2,ref} \sqrt{\frac{L_{e2,ref}}{L_{e2,j}}} \sqrt{\frac{K_{e2,j}}{K_{e2,ref}}} \cdot 10^{\left(\frac{\Delta_{harq}}{20}\right)}$$ (Equation 45)

where $L_{e1,i}$, $L_{e2,i}$, $K_{e1,i}$, and $K_{e2,i}$, may be the parameters generated from the E-TFC selection procedure for j:th E-TFC for the primary and secondary streams respectively. For example, $\Delta_{harq}$ may be related to the quality of service and a larger value of $\Delta_{harq}$, may give rise to a larger scaling factor.

In accordance with an embodiment, the network may configure common set power reference parameters for both streams. For example, $\beta_c$ may be a gain factor for DPCCH, $A_{ec}$ may be a relative power ratio for E-DPCCH, $A_{ed}$ may be a relative power ratio for E-DPDCH, $L_{e,ref}$ may be a number of E-DPDCHs used in reference, $K_{e,ref}$ may be a number of data bits used in reference. In this example, for the primary stream the gain factors may be:

$\beta_{ec1} = A_{ec} \cdot \beta_c$ (Equation 46)

$\beta_{ea,ref1} = A_{ea} \cdot \beta_c$ (Equation 47)

$$\beta_{ed1,f,harq} = \beta_{ed1,ref} \sqrt{\frac{L_{e1,ref}}{L_{e2,j}}} \sqrt{\frac{K_{e1,j}}{K_{e1,ref}}} \cdot 10^{\left(\frac{\Delta_{harq}}{20}\right)}$$ (Equation 48)

Similarly, for the secondary stream the gain factors may be:

$\beta_{ec2} = A_{ec} \cdot \beta_c$ (Equation 49)

$\beta_{ea,ref2} = A_{ea} \cdot \beta_c$ (Equation 50)

$$\beta_{ed2,f,harq} = \beta_{ed2,ref} \sqrt{\frac{L_{e2,ref}}{L_{e2,j}}} \sqrt{\frac{K_{e2,j}}{K_{e1,ref}}} \cdot 10^{\left(\frac{\Delta_{harq}}{20}\right)}$$ (Equation 51)

As described herein above, the transmitted power of the secondary stream may be limited to avoid excessive power demand in an ill-conditioned MIMO channel condition. If the power of the secondary stream needs to be limited for a period of time, the UE may choose to perform the E-TFC procedure with exceptions based on the excessive power demand for the secondary stream. For example, the UE may stop scheduling any data over the secondary stream until the secondary ILPC comes back to normal operation, such as when a power down request from a TPC command is received. In another example, the UE may schedule less data using the current power setting of DPCCH as power reference. If excessive HARQ retransmission is observed, or consecutive up TPC commands are received, the UE may stop scheduling any data over the secondary stream until the secondary ILPC recovers its normal operation. For other physical channels, such as HS-DPCCH, DPDCH, the power reference can be treated in a similar way as described in the above. The difference is that they may be in the primary stream.

In another embodiment, the physical channels that may need a power reference may be unprecoded. For example, for closed-loop transmit diversity or MIMO in the uplink, some physical channels may be unaffected by the precoding weights. A transmitter structure having some of the physical channels precoded differently than other channels may be practical for some reasons. For example, HS-DPCCH may be unprecoded in order to ensure the downlink data transmission is un-impacted.

Figure 14:
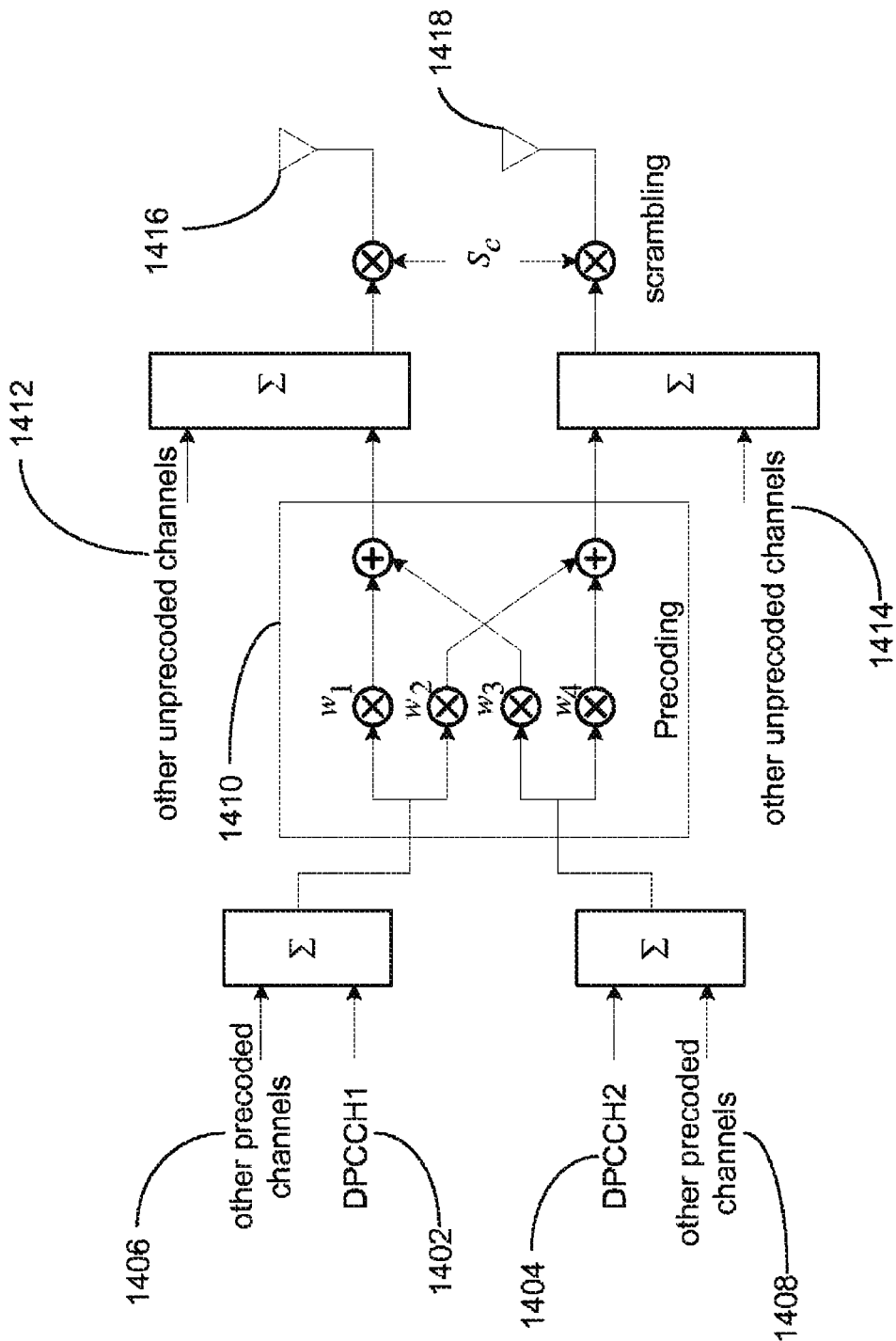
FIG. 14 illustrates an example uplink MIMO system with some unprecoded channels.

FIG. 14 illustrates an example transmitter structure wherein the pilot reference channels, for example DPCCH1 1402 and DPCCH2 1404, are precoded, but other unprecoded channels 1412 are not precoded and may be carried on the primary stream. Similarly, other unprecoded channels 1414 are not precoded and carried on the secondary stream. As shown in FIG. 14, DPCCH1 1402 and other precoded channels 1406 may be combined and input into precoder 1410. DPCCH2 1404 and other precoded channels 1408 may also be combined and input into precoder 1410. After being affected by the precoding weights, The primary stream may be combined with other unprecoded channels 1412 and the secondary stream may be combined with other unprecoded channels 1414. The resulting streams may be scrambled prior to transmission via antenna 1416 and antenna 1418.

Since the unprecoded channels may be transmitted through an effectively different propagation channel than the precoded reference channels (e.g., DPCCH1 1402 and DPCCH 1404), the power reference for these channels may be more complicated. Without compensating for the difference in effective propagation path, controlling the transmit power on these channels may be difficult, thus making it difficult to achieve a desired transmission quality.

If the UE has knowledge of the uplink channel state information (CSI), the power relation may be reestablished between a precoded reference channel and an unprecoded physical channel, for example by estimating the power difference caused by the use of different precoding weights. The estimated difference may be used as an additional adjustment to the power reference procedure described herein. Due to the fast-changing nature of the radio channel condition, a power adjustment procedure that corrects for differences in the effective propagation paths of different channels may need to be performed dynamically on a radio frame or sub-frame basis.

In an example embodiment, a 2×1 transmit diversity system may be implemented. For example, the channel coefficients matrix may be defined as $H=[h_1 h_2]$. In this example, the estimated power difference between two unprecoded channels and a power reference channel (e.g., DPCCH1 and/or DPCCH2) may be expressed as:

$$\gamma = 10\log10\left(\frac{w_u^H \hat{H}^H \hat{H} w_u}{w_r^H \hat{H}^H \hat{H} w_r}\right) \text{ (dB)} \qquad \text{(Equation 52)}$$

where $w_p$ may be the precoding vector used by the reference channels, and $w_u$ may be a constant vector for the unprecoded channels. For example, if $$w_u = \begin{bmatrix} 1 \\ 0 \end{bmatrix},$$

the unprecoded channel is transmitted on one antenna. In another example, if $$w_u = \begin{bmatrix} 1 \\ 1 \end{bmatrix},$$

the unprecoded channel may be transmitted on both antennas in equal parts. $\hat{H}$ may be an estimate of the channel coefficient matrix $w_u$.

At UE, the uplink CSI information may be unavailable. In an embodiment, the optimal precoding weights, which may be calculated based on the CSI, may be signaled by the Node B via downlink transmission. Therefore, according to an embodiment, the signaled optimum precoding vector may be used as the approximate CSI. For example, in the above 2×1 transmit diversity case, the channel may be approximated by:

$$\hat{H} = w_T^H \qquad \text{(Equation 53)}$$

which may be based on an assumption that the optimum vector may be determined by the Node B by the following relation:

$$w_T = \hat{H}^H / \sqrt{\hat{H}\hat{H}^H} \qquad \text{(Equation 54)}$$

In an embodiment, the power ration estimation may therefore be expressed as:

$$\gamma = 10\log10\left(\frac{w_u^H w_r w_r^H w_u}{w_r^H w_r w_r^H w_r}\right) \text{ (dB)} \qquad \text{(Equation 55)}$$

This embodiment may be applied to a more generalized case by assuming $w_u$ may be the precoding vector applied to a related physical channel and the reference channel uses $W_p$ as a precoding weight, which, for example, may be assumed to be constant. This may be the case where the related physical channel may use a different precoding vector from the power reference channel (e.g., DPCCH). In another example, the reference channel, for example DPCCH, may be unprecoded and the related physical channel may be precoded by the optimum weight.

Figure 15:
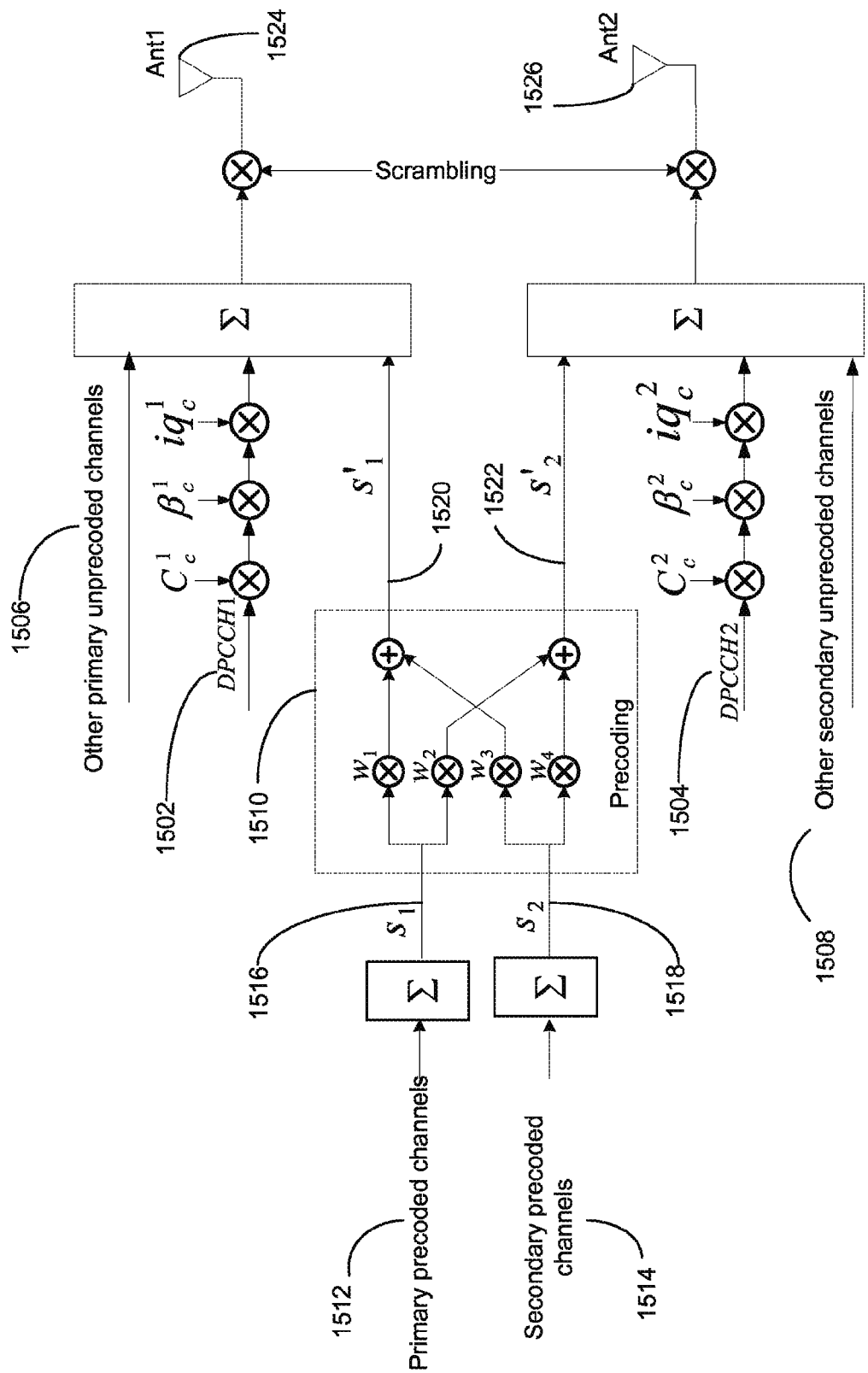
FIG. 15 illustrates an example MIMO transmitter structure with an unprecoded reference channel.

FIG. 15 illustrates an example transmitter structure wherein the reference channels are unprecoded while some physical channels are precoded. As shown in FIG. 15, DPCCH1 1502 may be unprecoded. Prior to being combined with other primary unprecoded channels 1506, DPCCH1 1502 may be spread using channelization code $C_c^1$, scaling gain factor $\beta_c^1$, and/or I/Q branch selection by I/Q index $iq_c^1$. Similarly, DPCCH2 1504 may be unprecoded. Prior to being combined with other primary unprecoded channels 1508, DPCCH2 1504 may be spread using channelization code $C_c^2$, scaling gain factor $\beta_c^2$, and/or I/Q branch selection by I/Q index $iq_c^2$. The pilot signals contained in DPCCH1 1502 and DPCCH2 1504 may be orthogonal such that the channelization codes $C_c^1$ and $C_c^2$ may be the same. In another example, the same pilot signals may used in both DPCCH1 1502 and DPCCH2 1504, and the channelization codes $C_c^1$ and $C_c^2$ may be orthogonal. In yet another example, $iq_c^1$ and $iq_c^2$ may be the same (for example, both mapping to Q branch), or they may be different (for example, based on performance analysis such as cubic metric). Generation of gain factors $\beta_c^1$ and $\beta_c^2$ will be described in more detail below.

The precoding coefficients of precoder 1510 ($w_1$, $w_2$, $w_3$, and $w_4$), may be received from a Node B over a reverse feedback channel. The precoding coefficients may also be calculated by the transmitter itself. The precoding coefficients may be expressed in matrix form as is described in matrix form as:

$$W = \begin{bmatrix} w_1 & w_3 \\ w_2 & w_4 \end{bmatrix} \qquad \text{(Equation 56)}$$

In an embodiment, the W may be unitary. For example, $W^H W = I$.

Primary precoded channels 1512 may include a E-DPCCH and zero or more E-DPDCHs. In an embodiment, HS-DPCCH and/or DPDCH, if configured, may be included in other primary unprecoded channels 1506, or may be part of primary precoded channels 1512. Secondary precoded channels 1514 may include a E-DPCCH and zero or more E-DPDCH(s). DPDCH, if configured, may be included in other secondary unprecoded channels 1508, or may also be part of the secondary precoded channels 1514.

Primary precoded channels 1512 may be processed individually by a spreading operation and may be summed to form a primary stream represented by $s_1$ which may be input into primary precoder input 1516. Secondary precoded channels 1514 may be processed individually by a spreading operation and may be summed to form a secondary stream represented by $s_2$ which may be input into secondary precoder input 1518. Spreading operation for each precoded channel is not shown in FIG. 15. Precoding operation may be performed at symbol or chip level, e.g., before or after a spreading operation. The structure shown in FIG. 15 may implement the transmitter structure for the single-stream configuration or closed-loop transmit diversity by not transmitting E-DPDCH and/or E-DPCCH in the secondary precoded channels 1514. The signal at primary precoder output 1520 may be represented by $s'_1$. The signal at secondary precoder output 1522 may be represented by $s'_2$. In an embodiment, other primary unprecoded channels 1506, DPCCH1 1502, and/or primary precoder output 1520 may be summed. Similarly, other secondary unprecoded channels 1508, DPCCH2 1504, and/or secondary precoder output 1522 may be summed. The two summed signals may be scrambled prior to transmission via antenna 1524 and antenna 1526. In another example, primary precoded channels 1512 and secondary precoded channels 1514 may be scrambled before the pre-coding operation. As may be appreciated, DPCCH1 1502 and the other primary unprecoded channels 1506 may be scrambled separately and then summed with the primary precoder output 1520. Similarly, DPCCH2 1504 and the other secondary unprecoded channels 1508 may be scrambled separately and then summed with the secondary precoder output 1522.

Gain factors for the reference channels may be obtained, for example, via signaling from a higher layer, and/or via calculation by a UE, a NodeB or the like. For example, denote $$\begin{bmatrix} \beta_{c_c^1} \\ \beta_{c_c^2} \end{bmatrix}$$

as the gain factors for DPCCH1 and DPCCH2, i.e., the power reference for two antenna branches. If DPDCH is not configured, or DPDCH is configured but precoded, $$\begin{bmatrix} \beta_{c_c^1} \\ \beta_{c_c^2} \end{bmatrix}$$

may be the same or different pre-defined values. For example $$\begin{bmatrix} \beta_{c_c^1} \\ \beta_{c_c^2} \end{bmatrix}$$

may be $$\begin{bmatrix} 1 \\ 1 \end{bmatrix}.$$

In another example, $\beta_{c_c^2}$ may be a function of $\beta_{c_c^1}$, e.g. $\beta_{c_c^2}$ may be a fixed offset of $\beta_{c_c^1}$. For example, $\beta_{c_c^2} = \beta_{off} \beta_{c_c^1}$, where $\beta_{off}$ may indicate a fixed offset which may be a pre-defined parameter or parameter signaled by higher layers. If DPDCH is configured and not precoded, a gain factor $\beta_{c_c^m}$, where m may denote the index of the transmitting antenna, may be individually signaled by a higher-layer or individually calculated. In another example, two gain factors $$\begin{bmatrix} \beta_{c_c^1} \\ \beta_{c_c^2} \end{bmatrix}$$

may include the same value signaled by higher-layer or calculated. In another example, $\beta_{c_c^1}$ may be signaled by higher layers and $\beta_{c_c^2}$ may be derived accordingly based on $\beta_{c_c^1}$. In an example, $\beta_{c_c^2}$ may be a function of $\beta_{c_c^1}$, e.g., $\beta_{c_c^2}$ may be a fixed offset of $\beta_{c_c^1}$. For example, $\beta_{c_c^2} = \beta_{off} \beta_{c_c^1}$, where $\beta_{off}$ may indicate a fixed offset which may be a pre-defined parameter or a parameter signaled from higher layers. In calculating gain factors for other primary and secondary non-precoded channels, the power reference $\beta_{c_c^m}$ may be selected such that the non-precoded channel is transmitted on the same $m^{th}$ antenna branch as the selected DPCCHm.

The power reference for each stream prior to precoding may be derived based on a virtual gain factor. For example, the virtual gain factor for the signal after precoding, $$\begin{bmatrix} s'_1 \\ s'_2 \end{bmatrix},$$

may be received and/or calculated as $$\begin{bmatrix} \beta_{s'_1} \\ \beta_{s'_2} \end{bmatrix},$$

for the derived virtual E-TFC based on a given E-TFC, for example a E-TFC signaled by higher layers. The gain factors for dual stream signal before precoding $$\begin{bmatrix} s_1 \\ s_2 \end{bmatrix},$$

may be derived as $$\begin{bmatrix} \beta_{s_1} \\ \beta_{s_2} \end{bmatrix},$$

which may be calculated based on the virtual gain factors $$\begin{bmatrix} \beta_{s'_1} \\ \beta_{s'_2} \end{bmatrix}.$$

In an embodiment, the gain factors for the signal before precoding may be determined using the precoding weights as is described below. The primary and/or secondary stream signal before the precoding operation may represent any corresponding channel, such as E-DPCCH, E-DPDCH, HS-DPCCH, DPDCH, or the like. For example, in various embodiments Equations 76, 78 and/or 78 may be used to determine channel gain factors based on virtual gain factors, as will be described in more detail below.

Figure 16:
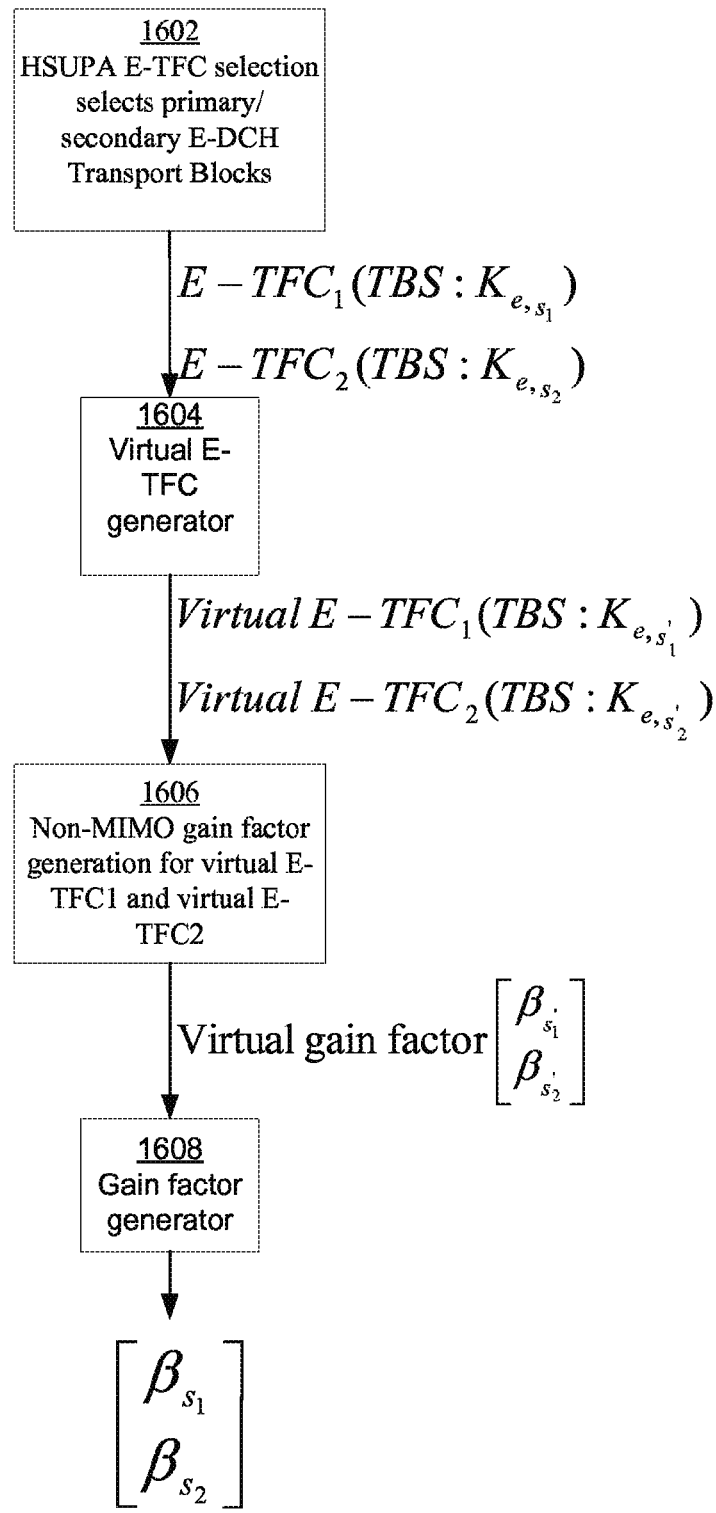
FIG. 16 is an example flow diagram for generating gain factors based on a virtual gain factor reference.

FIG. 16 illustrates an example implementation of per-stream gain factor generation that may be implemented in UL MIMO for HSUPA. At 1602 the HSUPA E-TFC selector may select the primary and/or secondary E-DCH transport blocks. The transport block size (TBS) of the E-TFC on the primary stream before precoding (i.e., E-TFC$_1$) may be represented as K$_{e,s_1}$. The TBS of the E-TFC on the secondary stream before precoding (i.e., E-TFC$_2$) may be represented as K$_{e,s_2}$.

For example, the virtual E-TFC may be the combined E-TFC after precoding for the signals $$\begin{bmatrix} s'_1 \\ s'_2 \end{bmatrix}$$

shown at primary precoder output 1520 and secondary precoder output 1522 of FIG. 15. At 1604 the Virtual E-TFC generator determines the virtual E-TFC based on the transport block sizes for the primary and secondary E-DCH transport blocks. For example, at 1604 the virtual E-TFC may be determined by:

$$\begin{bmatrix} K_{e,s'_1} \\ K_{e,s'_2} \end{bmatrix} = \begin{bmatrix} \alpha & 1-\alpha \\ 1-\alpha & \alpha \end{bmatrix} \quad \text{(Equation 57)}$$

$$\begin{bmatrix} K_{e,s_1} \\ K_{e,s_2} \end{bmatrix} = \begin{bmatrix} \alpha * K_{e,s_1} + (1-\alpha) * K_{e,s_2} \\ (1-\alpha) * K_{e,s_1} + \alpha * K_{e,s_2} \end{bmatrix}$$

where K$_{e,s_1}$ may be the E-DCH transport block size (TBS) of the E-TFC on the primary stream before precoding (e.g., TBS$_{s_1}$) which may be indicated by (or mapped to) E-TFCI$_1$, and K$_{e,s_2}$, may be the E-DCH TBS of the E-TFC on the secondary stream before precoding, (e.g., TBS$_{s_2}$), which may be indicated by (or mapped to) E-TFCI$_2$. K$_{e,s'_1}$ may be the virtual E-DCH TBS of the virtual E-TFC on the primary antenna branch after pre-coding. which may be represented as TBS$_{s'_1}$. K$_{e,s'_2}$ may be the virtual E-DCH TBS of the virtual E-TFC on the secondary antenna branch after pre-coding, which may be represented as TBS$_{s'_2}$. For example, TBS$_{s'_1}$ may map to the virtual E-TFCI$_1$ and TBS$_{s'_2}$ may map to the virtual E-TFCI$_2$. K$_{e,s'_1}$ and K$_{e,s'_2}$ may be used to determine the amount of power that may be required to transmit the pre-coded signals allocated to two or more antennas. For simplicity, K$_{e,m}$ may be used to indicate the TBS of virtual E-TFC on the m$^{th}$ antenna branch. α may be weight factor to account for both TBS$_{s_1}$ and TBS$_{s_2}$ so that TBS$_{s'_1}$ and TBS$_{s'_2}$ may represent the transport block size of the mixed (or combined) signals after pre-coding at signal point $$\begin{bmatrix} s'_1 \\ s'_2 \end{bmatrix}.$$

α may be a pre-defined parameter with the range of 0≤α≤1. Optionally, it may be a parameter configured and signaled by higher layers. In an embodiment, for dual-stream case α may be equal to ½. In another example, α may be 1 when the secondary transport block E-DCH is not scheduled, or when precoding is not implemented in a MIMO UE.

At 1606, the virtual gain factors $$\begin{bmatrix} \beta_{s'_1} \\ \beta_{s'_2} \end{bmatrix},$$

may be determined based on the virtual E-DCH transport block sizes determined at 1604. The virtual gain factors, $$\begin{bmatrix} \beta_{s'_1} \\ \beta_{s'_2} \end{bmatrix},$$

may represent the gain factors for the signal after the precoding. After generating the virtual gain factors for the combined signal after precoding, at 1608 the virtual gain factors may be used to determine the gain factors for the primary and secondary stream before precoding, which may be represented as $$\begin{bmatrix} \beta_{s_1} \\ \beta_{s_2} \end{bmatrix}.$$

The determination of the gain factors for the primary and secondary stream before precoding based on the virtual gain factors will be discussed in more detail below.

In another example embodiment, the UE may individually calculate the gain factors for E-DPCCH1 and E-DPCCH2 (i.e., β$_{ec_1}$ and β$_{ec_2}$), and may then combine the gain factors to obtain the virtual gain factor for the precoded E-DPCCHs at signal point $$\begin{bmatrix} s'_1 \\ s'_2 \end{bmatrix}.$$

For example, the virtual gain factor for the precoded E-DPCCHs may be represented as:

$$\begin{bmatrix} \beta_{ec'_1} \\ \beta_{ec'_2} \end{bmatrix} = \begin{bmatrix} \sqrt{\alpha * \beta^2_{ec_1} + (1-\alpha) * \beta^2_{ec_2}} \\ \sqrt{(1-\alpha) * \beta^2_{ec_1} + \alpha * \beta^2_{ec_2}} \end{bmatrix} \quad \text{(Equation 58)}$$

In another example embodiment, the UE may directly calculate the virtual gain factor for the precoded E-DPCCHs at signal point $$\begin{bmatrix} s'_1 \\ s'_2 \end{bmatrix}.$$

For example, the virtual gain factor may be calculated using the similar procedure used for non-MIMO UE by replacing factors related to the respective E-TFC with the virtual E-TFC. For example, when the virtual E-TFCI≤E-TFCI$_{ec,boost}$, the gain factor for the m$^{th}$ antenna branch E-DPCCH may be:

$$\beta_{ec'_3} = \beta_{c^3} \cdot A_{ec_m} \quad \text{(Equation 59)}$$

where E-TFCI$_{ec,boost}$ may be signaled by higher layers, and the ratio the ratio A$_{ec_m}$ may be derived from the parameter $\Delta_{E\text{-}DPCCH}{}^{in}$ signaled by higher layers. In another example, if the virtual E-TFCI>E-TFCI$_{ec,boost}$, the gain factor may be determined by:

$$\beta_{ec'_m,i,uq} = \beta_{c^m} \cdot \sqrt{\max\left(A_{ec_m}^2, \frac{\sum_{k=1}^{k_{max,j}}\left(\frac{\beta_{ed'_m,i,k}}{\beta_{c^m}}\right)^2}{10^{\frac{\Delta_{T2TP}}{10}}} - 1\right)} \quad \text{(Equation 60)}$$

where $\Delta_{T2TP}$ may be signaled by higher layers, and $\beta_{ed'_m,i,k}$ may be the E-DPDCH beta gain factor for the ith virtual E-TFC on the kth physical channel, and $k_{max,i}$ may be the number of physical channels used for the ith virtual E-TFC.

Virtual gain factors for E-DPDCH may also be computed based on virtual E-TFC. The virtual gain factor computation may take into account that the E-DPDCH1 and E-DPDCH2 may be mixed at signal point $$\begin{bmatrix} s'_1 \\ s'_2 \end{bmatrix}$$

after precoding. The E-DPDCH virtual gain factor, $\beta_{ed}$, for each virtual E-TFC and HARQ offset may have a different value. For example, $\beta_{ed}$ may be calculated as described below.

In the example embodiment, the gain factors for E-DPDCH1 and E-DPDCH2, i.e. $\beta_{ed_1}$ and $\beta_{ed_2}$, may be calculated individually. $\beta_{ed_1}$ and $\beta_{ed_2}$ may correspond to E-TFCI1 and E-TFCI2. The gain factors may be combined to obtain the virtual gain factor for the precoded E-DPCCHs at signal point $$\begin{bmatrix} s'_1 \\ s'_2 \end{bmatrix}.$$

For example, the E-DPDCH virtual factor may be determined by:

$$\begin{bmatrix} \beta_{ed'_1} \\ \beta_{ed'_2} \end{bmatrix} = \begin{bmatrix} \sqrt{\alpha * \beta_{ed_1}^2 + (1-\alpha) * \beta_{ed_2}^2} \\ \sqrt{(1-\alpha) * \beta_{ed_1}^2 + \alpha * \beta_{ed_2}^2} \end{bmatrix} \quad \text{(Equation 61)}$$

In another example embodiment, the virtual gain factor for the precoded E-DPDCHs at signal point $$\begin{bmatrix} s'_1 \\ s'_2 \end{bmatrix}$$

may be calculated using the similar procedure as in a non-MIMO UE, by replacing factors related to an E-TFC with the virtual E-TFC. For example, in configuring E-DPDCH power extrapolation formula, the temporary variable for the ith virtual E-TFC, $\beta_{ed'_m,i,harq}{}^q$ may be determined by:

$$\beta_{ed'_m,i,harq} = \beta_{ed_m,ref} \sqrt{\frac{L_{e,ref}}{L_{e,i_m}}} \sqrt{\frac{K_{e,i_m}}{K_{e,ref}}} \cdot 10^{\left(\frac{\Delta harq}{20}\right)} \quad \text{(Equation 62)}$$

In configuring E-DPDCH power interpolation formula, the temporary variable for the ith virtual E-TFC, $\beta_{ed'_m,i,harq}$ may be determined by:

$$\beta_{ed'_m,i,harq}\sqrt{\frac{L_{e,ref,1}}{L_{e,i_m}}} \cdot \sqrt{\left(\left(\frac{\frac{L_{e,ref,2}}{L_{e,ref,1}}\beta_{ed_m,ref,2}^2 - \beta_{ed_m,ref,1}^2}{K_{e,ref,2} - K_{e,ref,1}}\right)(K_{e,i_m} - K_{e,ref,1}) + \beta_{ed_m,ref,1}^2\right) \cdot 10^{\left(\frac{\Delta harq}{20}\right)}} \quad \text{(Equation 63)}$$

where $L_{e,i}$ denotes the number of E-DPDCHs that may be used for the ith virtual E-TFC, and denotes the transport block size of the ith virtual E-TFC on the M$^{th}$ antenna branch as defined above.

In an embodiment, $\beta_{ed'_m,i,harq}$ may be set to 0 when:

$$\left(\frac{\frac{L_{e,ref,2}}{L_{e,ref,1}}\beta_{ed_m,ref,2}^2 - \beta_{ed_m,ref,1}^2}{K_{e,ref,2} - K_{e,ref,1}}\right)(K_{e,i_m} - K_{e,ref,1}) + \beta_{ed_m,ref,1}^2 \leq 0 \quad \text{(Equation 64)}$$

For each reference E-TFC, a reference gain factor $\beta_{ed_m,ref}$ on the m$^{th}$ antenna branch may be determined according to:

$$\beta_{ed_m,ref} = \beta_{c^m} \cdot A_{ed_m} \quad \text{(Equation 65)}$$

For example, the quantized amplitude ratio $A_{ed_m}$ may be translated from $\square_{E\text{-}DPDCH}{}^m$ signaled by higher layers. In another example, $\Delta HARQ$ may be a function of $\Delta HARQ_1$ and $\Delta HARQ_2$ which may be the HARQ offsets respectively used for support of different HARQ profile for E-TFCI$_1$ and E-TFCI$_2$ configured by higher layers. For example, $\Delta HARQ = \min(\Delta HARQ_1, \Delta HARQ_2)$ or $\Delta HARQ = \max(\Delta HARQ_1, \Delta HARQ_2)$.

The computation for virtual gain factors for HS-DPCCH, $\beta_{hs}$, may take into account that HS-DPCCH on the primary stream may be separated to antenna branches at signal point $$\begin{bmatrix} s'_1 \\ s'_2 \end{bmatrix}$$

after precoding. For example, $\beta_{hs}$ may be determined based on:

$$\beta_{hs} = \beta_c \cdot 1 \cdot A_{hs} \quad \text{(Equation 66)}$$

where an HS-DPCCH is active, the values for $\Delta_{ACK}$, $\Delta_{NACK}$ and $\Delta_{CQI}$ that may be set by higher layers may be translated to the quantized amplitude ratio $A_{hs}$. The virtual gain factor for the precoded HS-DPCCHs at signal point $$\begin{bmatrix} s'_1 \\ s'_2 \end{bmatrix}$$

may be determined based on:

$$\begin{bmatrix} \beta_{hs'_1} \\ \beta_{hs'_2} \end{bmatrix} = \begin{bmatrix} \sqrt{\alpha} * \beta_{hs} \\ \sqrt{(1-\alpha)} * \beta_{hs} \end{bmatrix} \quad \text{(Equation 67)}$$

Virtual gain factors for DPDCHs may also be computed based on a virtual E-TFC. The virtual gain factor computation may take into account that the DPDCH1 and DPDCH2 may be mixed at signal point $$\begin{bmatrix} s'_1 \\ s'_2 \end{bmatrix}$$

after precoding. The DPDCH virtual gain factors may be determined, for example, using the methods described below. In a first example, the gain factors for DPDCH1 and DPDCH2, $\beta_{d_1}$ and $\beta_{d_2}$, may be calculated individually. $\beta_{d_1}$ and $\beta_{d_2}$ may correspond to TFCI1 and TFCI2 $\beta_{d_1}$ and $\beta_{d_2}$ may be utilized to obtain the virtual gain factor for the precoded E-DPCCHs at signal point, for example using:

$$\begin{bmatrix} \beta_{d'_1} \\ \beta_{d'_2} \end{bmatrix} = \begin{bmatrix} \sqrt{\alpha * \beta_{d_1}^2 + (1-\alpha) * \beta_{d_2}^2} \\ \sqrt{(1-\alpha) * \beta_{d_1}^2 + \alpha * \beta_{d_2}^2} \end{bmatrix} \quad \text{(Equation 68)}$$

In another example embodiment, the virtual TFC may be introduced and defined as the combined TFC after precoding at the signal point $$\begin{bmatrix} s'_1 \\ s'_2 \end{bmatrix},$$

in a manner similar to the method described for the E-DP-DCH. For example, the virtual TFC may be represented as:

$$\begin{bmatrix} K'_{s_1} \\ K'_{s_2} \end{bmatrix} = \begin{bmatrix} \alpha & 1-\alpha \\ 1-\alpha & \alpha \end{bmatrix} \begin{bmatrix} K_{s_1} \\ K_{s_2} \end{bmatrix} = \begin{bmatrix} \alpha * K_{s_1} + (1-\alpha) * K_{s_2} \\ (1-\alpha) * K_{s_1} + \alpha * K_{s_2} \end{bmatrix} \quad \text{(Equation 69)}$$

where $K_{s_1}$ may be the E-DCH TBS of the TFC on the primary stream before pre-coding (e.g., $TBS_{s_1}$) and $K_{s_2}$ may be the E-DCH TBS of the TFC on the secondary stream before pre-coding (e.g., $TBS_{s_2}$). $K_{s'_1}$ may be the virtual E-DCH transport block size (TBS) of the virtual E-TFC on the primary antenna branch after pre-coding, which may be represented as $TBS_{s'_1}$. $K_{s'_2}$ may be the virtual DCH transport block size (TBS) of the virtual TFC on the secondary antenna branch after pre-coding, which may be represented as $TBS_{s'_2}$. For example, $TBS_{s'_1}$ may map to the virtual $TFCI_1$ and $TBS_{s'_2}$ may map to the virtual $TFCI_2$. $K_{s'_1}$ and $K_{s'_2}$ may be used to determine the amount of power that may be required to transmit the pre-coded signals allocated to two or more antennas. For simplicity, $K_m$ may be used to indicate the TBS of virtual TFC on the $m^{th}$ antenna branch. $\alpha$ may be weight factor to account for both $TBS_{s_1}$ and $TBS_{s_2}$ so that $TBS_{s'_1}$ and $TBS_{s'_2}$ may represent the transport block size of the mixed (or combined) signals after pre-coding at signal point $$\begin{bmatrix} s'_1 \\ s'_2 \end{bmatrix}.$$

$\alpha$ may be a pre-defined parameter with the range of $0 \leq \alpha \leq 1$. Optionally, it may be a parameter configured and signaled by higher layers. In an embodiment, for dual-stream case $\alpha$ may be equal to ½. In another example, $\alpha$ may be 1 when the secondary transport block E-DCH is not scheduled, or when precoding is not implemented in a MIMO UE. The virtual gain factor for the precoded DPDCHs at signal point $$\begin{bmatrix} s'_1 \\ s'_2 \end{bmatrix}$$

may be determined based on factors related to the virtual TFC.

In an embodiment, the gain factors $\beta_c$ and $\beta_d$ may be signaled by higher layers for the jth virtual TFC and the variable $A_j$, or the nominal power relation, may be determined based on:

$$A_{j'_m} = \frac{\beta_{d'_m}}{\beta_{c'_m}} \quad \text{(Equation 70)}$$

In another embodiment, the gain factors $\beta_c$ and $\beta_d$ may be computed for the jth virtual TFCs using similar procedure as in a non-MIMO UE, by replacing factors related to the given TFC with the virtual TFC. For example, $A_{j'_m}$, or the virtual nominal power relation, may then be determined based on:

$$A_{j'_m} = \frac{\beta_{d,ref}}{\beta_{c,ref}} \cdot \sqrt{\frac{L_{ref}}{L_{j_m}}} \sqrt{\frac{K_{j_m}}{K_{ref}}} \quad \text{(Equation 71)}$$

Further, the gain factors for the jth virtual TFC may be computed based on $A_{j'_m}$.

Next, the gain factor for dual stream signal $$\begin{bmatrix} s_1 \\ s_2 \end{bmatrix}$$

can be derived and calculated based on the virtual gain factors $$\begin{bmatrix} \beta_{s'_1} \\ \beta_{s'_2} \end{bmatrix}.$$

By way of example, the signals before precoding may be represented as $$\begin{bmatrix} s_1 \\ s_2 \end{bmatrix},$$

and the signals after precoding may be represented as $$\begin{bmatrix} s'_1 \\ s'_2 \end{bmatrix},$$

where $$\begin{bmatrix} s'_1 \\ s'_2 \end{bmatrix} = \begin{bmatrix} w_1 & w_3 \\ w_2 & w_4 \end{bmatrix} \begin{bmatrix} c_{s_1} iq_{s_1} & 0 \\ 0 & c_{s_2} iq_{s_2} \end{bmatrix} \begin{bmatrix} s_1 \\ s_2 \end{bmatrix} \quad \text{(Equation 72)}$$

If the appropriate gain factors are applied, the relationship between the signals before and after precoding may be:

$$\begin{bmatrix} \beta_{s'_1} & 0 \\ 0 & \beta_{s'_2} \end{bmatrix} \quad \text{(Equation 73)}$$

$$\begin{bmatrix} s'_1 \\ s'_2 \end{bmatrix} = \begin{bmatrix} w_1 & w_3 \\ w_2 & w_4 \end{bmatrix} \begin{bmatrix} \beta_{s_1} & 0 \\ 0 & \beta_{s_2} \end{bmatrix} \begin{bmatrix} c_{s_1} iq_{s_1} & 0 \\ 0 & c_{s_2} iq_{s_2} \end{bmatrix} \begin{bmatrix} s_1 \\ s_2 \end{bmatrix}$$

By substituting the result of Equation 72 into Equation 73 and canceling common terms, the remaining relations may be:

$$\begin{bmatrix} \beta_{s'_1} & 0 \\ 0 & \beta_{s'_2} \end{bmatrix} \begin{bmatrix} w_1 & w_3 \\ w_2 & w_4 \end{bmatrix} = \begin{bmatrix} w_1 & w_3 \\ w_2 & w_4 \end{bmatrix} \begin{bmatrix} \beta_{s_1} & 0 \\ 0 & \beta_{s_2} \end{bmatrix} \quad \text{(Equation 74)}$$

$$\begin{bmatrix} w_1 & w_3 \\ w_2 & w_4 \end{bmatrix}^{-1} \begin{bmatrix} \beta_{s'_1} & 0 \\ 0 & \beta_{s'_2} \end{bmatrix} \begin{bmatrix} w_1 & w_3 \\ w_2 & w_4 \end{bmatrix} = \quad \text{(Equation 75)}$$

$$\begin{bmatrix} w_1 & w_3 \\ w_2 & w_4 \end{bmatrix}^{-1} \begin{bmatrix} w_1 & w_3 \\ w_2 & w_4 \end{bmatrix} \begin{bmatrix} \beta_{s_1} & 0 \\ 0 & \beta_{s_2} \end{bmatrix} = I \begin{bmatrix} \beta_{s_1} & 0 \\ 0 & \beta_{s_2} \end{bmatrix}$$

For example, the virtual gain factor for signal $$\begin{bmatrix} s'_1 \\ s'_2 \end{bmatrix}$$

such as $$\begin{bmatrix} \beta_{s'_1} \\ \beta_{s'_2} \end{bmatrix}$$

may be calculated based on the power reference $$\begin{bmatrix} \beta_{c_c^1} \\ \beta_{c_c^2} \end{bmatrix}.$$

The calculation may take into account that a precoded channel may be a mixed signal of dual stream of the corresponding channel. In another example, the virtual E-TFC, or virtual TFC if DPDCH is precoded, may be applied to the different channel gain factor calculation procedures that may be used for non-MIMO UEs. In an example embodiment, the gain factors $$\begin{bmatrix} \beta_{s_1} \\ \beta_{s_2} \end{bmatrix},$$

for signal $$\begin{bmatrix} s_1 \\ s_2 \end{bmatrix}$$

may be determined based on:

$$\begin{bmatrix} \beta_{s_1} & 0 \\ 0 & \beta_{s_2} \end{bmatrix} = \begin{bmatrix} w_1 & w_3 \\ w_2 & w_4 \end{bmatrix}^{-1} \begin{bmatrix} \beta_{s'_1} & 0 \\ 0 & \beta_{s'_2} \end{bmatrix} \begin{bmatrix} w_1 & w_3 \\ w_2 & w_4 \end{bmatrix} \quad \text{(Equation 76)}$$

In another embodiment, the precoding matrix W may be a unitary matrix, and the gain factors $$\begin{bmatrix} \beta_{s_1} \\ \beta_{s_2} \end{bmatrix},$$

for signal $$\begin{bmatrix} s_1 \\ s_2 \end{bmatrix}$$

may be determined based on:

$$\begin{bmatrix} \beta_{s_1} & 0 \\ 0 & \beta_{s_2} \end{bmatrix} = \begin{bmatrix} w_1 & w_3 \\ w_2 & w_4 \end{bmatrix}^H \begin{bmatrix} \beta_{s'_1} & 0 \\ 0 & \beta_{s'_2} \end{bmatrix} \begin{bmatrix} w_1 & w_3 \\ w_2 & w_4 \end{bmatrix} \quad \text{(Equation 77)}$$

In an embodiment, the precoding matrix W may be orthogonal and invertible. As such, in order to maintain the relationships described in Equations 76 and 77, the relationships between the gain factors may be:

$$\beta_{s_1} = \beta_{s_2} = \beta_{s'_1} = \beta_{s'_2} \quad \text{(Equation 78)}$$

As summation and precoding weighting are linear operations, the relationship between the gain factor of dual stream, $$\begin{bmatrix} \beta_{s_1} & 0 \\ 0 & \beta_{s_2} \end{bmatrix},$$

and the virtual gain factors, $$\begin{bmatrix} \beta_{s'_1} & 0 \\ 0 & \beta_{s'_2} \end{bmatrix},$$

in Equations 76, Equation 77, or Equation 78 may be applied to precoded channels, for example, but not limited to, E-DPDCH, E-DPCCH, HS-DPCCH, DPDCH. The power reference and gain factor for precoded channels, for example E-DPDCH, E-DPCCH, HS-DPCCH, DPDCH, may be determined, for example, based on the following methods. For example, in various embodiments Equations 76, 78 and/or 78 may be used. In an example embodiment, the gain factor for a precoded channel may be determined by substituting the virtual gain factor determined above into Equation 76. In another example, the gain factor may be determined based on substituting the virtual gain factor into equation 77. Additionally, taking into account that in some circumstances $\beta_{s_1}=\beta_{s_2}=\beta_{s'_1}=\beta_{s'_2}$ in order to maintain the orthogonality of the precoding matrix and achieve better transmit diversity gain addition, the gain factors for the precoded channels may also be determined.

Figure 17:
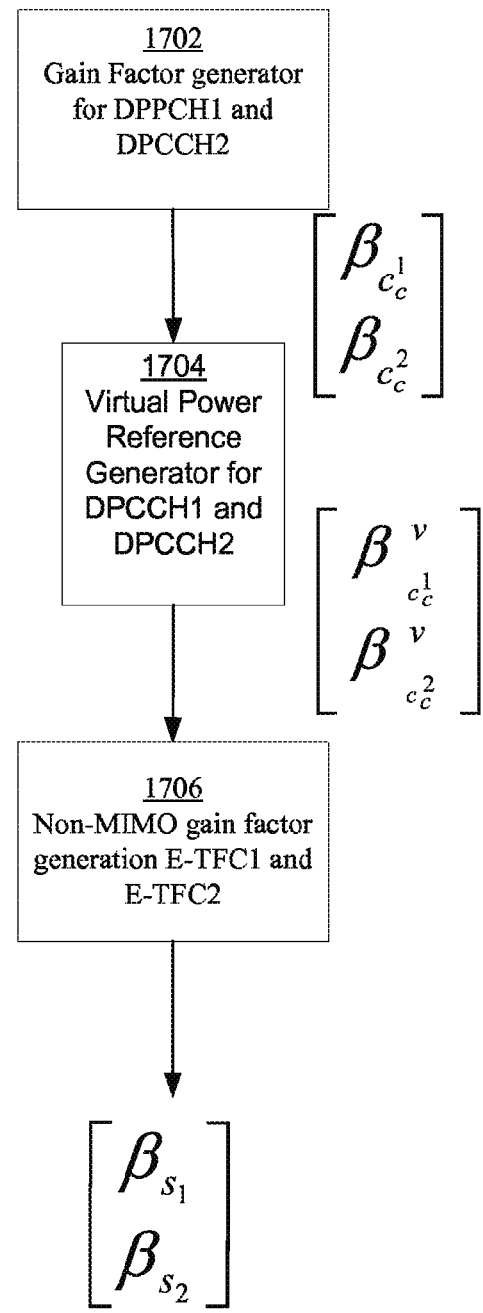
FIG. 17 is an example flow diagram from generating gain factors based on a virtual power reference.

FIG. 17 illustrates a method of generating the gain factors that may be applied to channels the primary and secondary stream prior to the precoding operation based on a virtual power reference. A non-MIMO gain factor generation for other channels may then be applied to generate gain factors for the primary and secondary stream. In this example, at 1702 gain factors for the DPPCH1 and DPPCH2, for example, $$\begin{bmatrix} \beta_{c_c^1} \\ \beta_{c_c^2} \end{bmatrix},$$

may be determined. At 1704, a virtual per-stream power reference may be determined as if the DPCCH1 and DPCCH2 are precoded. For example, the gain factor for a precoded channel may be calculated by obtaining the virtual per-stream power reference, $$\begin{bmatrix} \beta^v_{c_c^1} \\ \beta^v_{c_c^2} \end{bmatrix},$$

by substituting the gain factor for DPCCH1 and DPCCH2, $$\begin{bmatrix} \beta_{c_c^1} \\ \beta_{c_c^2} \end{bmatrix},$$

into Equation 76 or Equation 77 if W is a unitary matrix. At 1706, the per-stream gain factor for a precoded channel may be determined based on a procedure similar to a gain factor calculation for non-MIMO systems using the virtual power reference.

The UL power control may be achieved by generating an estimated SIR ($SIR_{est}$), generating a target SIR ($SIR_{tartget}$) and generating one or more TPC commands by comparing $SIR_{est}$ with $SIR_{tartget}$. The UL power control mechanism may be implemented on a NodeB. In an embodiment, a single $SIR_{est}$ and a single $SIR_{target}$ may be used for multiple transmit streams such as data streams.

An estimated SIR may be generated for each DPCCH, and a single SIR estimation for power control loop may be generated based on the individual estimated SIRs. For example, let SIRest1 and SIRest2 denote SIR estimation for $DPCCH^1$ and $DPCCH^2$, respectively. The $SIR_{est}$ may be calculated based on a weighted average of $SIR_{est1}$ and $SIR_{est2}$, e.g., $SIR_{est}$ may be $a*SIR_{est1}+(1-a)*SIR_{est2}$, where parameter a may be 0<a<1 and may be determined based on one or more criteria. Parameter a may be determined based on the values of $SIR_{est1}$ and $SIR_{est2}$. For example, $SIR_{est}$ may be min ($SIR_{est1}$, $SIR_{est2}$), where a=0 if $SIR_{est1}$>$SIR_{est2}$, otherwise a may be 1. Alternatively, $SIR_{est}$ may be max ($SIR_{est1}$, $SIR_{est2}$), where a=1 if $SIR_{est1}$>$SIR_{est2}$, otherwise a may be 0. Also, parameter a may be determined based on the quality of the $SIR_{est1}$ and $SIR_{est2}$, such as the importance of the data stream, type of service, or variance of the $SIR_{est1}$ and $SIR_{est2}$. For example, more weight can be assigned to the SIR estimation that may have better quality (e.g., smaller variance). $SIR_{test}$ may be decided based on the primary stream, for example if a is equal to 1. In this example, $SIR_{target}$ may equal $SIR_1$.

The $SIR_{est}$ may also be calculated based on Ps_comb/Pi_comb, where Ps_comb may be the combined signal power of two streams and Pi_comb may be the combined interference power. Ps_comb and Pi_comb can be computed using weighted average of signal power and interference power that may correspond to two data streams.

A target SIR may be generated for each DPCCH, and a single target SIR for power control loop may be generated based on the individual target SIRs. For example, let SIRtarget1 and SIRtarget2 denote target SIR for data stream 1 and 2, respectively. A target SIR may be generated based on long term measurement of data BLER by RNC. For example, a single SIR target for the UL power control loop may be generated based on a weighted average of $SIR_{target1}$ and $SIR_{target2}$.

The $SIR_{target}$ may be calculated based on $a*SIR_{target1}+(1-a)*SIR_{target2}$, where parameter a may be 0<=a<=1 and may be determined based on one or more criteria. Parameter a may be determined based on the values of $SIR_{target1}$ and $SIR_{target2}$. For example, $SIR_{target}$ may be min ($SIR_{target1}$, $SIR_{target2}$), where a may be 0 when $SIR_{target1}$>$SIR_{target2}$, otherwise, a may be 1. In this example, the UL interference may be reduced to increase system capacity. In another example, $SIR_{target}$ may be max ($SIR_{target1}$, $SIR_{target2}$), where a may be 1 when $SIR_{target1}$>$SIR_{target2}$, and otherwise a may be 0. In this example, the UL interference may be increased, but may benefit a UE that transmits a large amount of data: Other possible criterion may be based on importance of the data stream or type of service. For example, $SIR_{target}$ may be decided based on the primary stream. For example, if a is equal to 1, then $SIR_{target}$ may equal $SIR_{target1}$.

The $SIR_{target}$ may also be calculated based on a combined BLER. The combined BLER may be the ratio of the total block errors of the data streams over total blocks received for both data streams.

In an embodiment, one power control loop may be implemented to simultaneously control multiple channels such as $DPCCH^1$ and $DPCCH^2$. For example, $SIR_{est\ and\ SIRtarget}$ may be generated as described above, and a single TPC command may be generated based on the $SIR_{est}$ and $SIR_{target}$, and may be run on the UL power control loop.

Alternatively, multiple TPC commands may be generated based on multiple estimated SIRs and multiple target SIRs. For example, two $SIR_{target}$ and $SIR_{est}$ may be used to generate two sets of TPC command from one cell. Let TPC_cmd(i,j) denote the TPC command generated for ith stream from jth cell in an active set. There may be several ways to generate a signal TPC command, TPC_cmd. For example, cell j may combine the TPC_cmd(1,j) and TPC_cmb(2,j), for example, at a base station or at a UE to generate stream combined power control command, TPC_scmb(j). Then, {TPC_scmb(j)} may be combined, for example, at the UE. In another example, {TPC_scmb(i,j)} for streams and cells of an active set may be directly combined, for example, at the UE. In yet another example, {TPC_cmb(1,j)} and {TPC_cmb(2,j)} may be combined to generate TPC_cmd(i) for i-th stream. Then, TPC_cmd(1) and TPC_cmd(2) for stream 1 and 2 may be combined to form a stream combined command, TPC_scmd.

In an embodiment, the algorithms for combining TPCs from cells of active set may be different from the algorithm for combining TPCs for multiple streams. For example, two TPC commands for two different streams may be combined based on TPC_scmd=min(TPC_cmd(1), TPC_cmd(2)), and/or TPC_scmd=max(TPC_cmd(1), TPC_cmd(2)). In addition, TPC commands may be combined based on factors such as throughput, latency, and/or application importance.

In an embodiment, multiple, such as two-power control loops may be implemented to interpedently control multiple channels such as $DPCCH^1$ and $DPCCH^2$. For example, if two UL power control loops run independently, the cells in the active set may estimate $SIR_{est,i}$ of the received uplink DPCH. The cells in the active set may then generate the i-th set of TPC commands and transmit the commands once per slot. For example, if $SIR_{est,i}>SIR_{target,i}$, the TPC command i may be "0", and if $SIR_{est,i}<SIR_{target,i}$ then the TPC command i may be "1".

Upon receiving one or more TPC commands in a TPC command combining period, the UE may derive a single TPC command, TPC_cmd(i). After deriving the combined TPC command TPC_cmd(i), the UE may adjust the transmit power of the uplink DPCCH,i based on $\Delta_{DPCCH0,i}$ (in dB), $\Delta_{DPCCH,i}$ (in dB) may be obtained based on $\Delta_{DPCCH,i}=\Delta_{TPC,i} \times$ TPC_cmd(i).

For example, $\Delta_{TPC,i}$ may be the layer 1 parameter that may be derived from the UE-specific higher-layer parameter "TPC-StepSize,i". TPC-StepSize,i may be configured to include the same value, or may be independently configured for two UL power control loop by higher layer. TPC-StepSize,i can also be configured to include the same value, where $\Delta_{TPC,i}$ can include different values by adding an offset between the UL power control loops. Similarly, the TPC command for the for i-th stream, TPC_cmd(i), may be generated by combining TPC commands {TPC_cmb(1,j)} and {TPC_cmb(2,j)}.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for providing transmit power control and configuring transmission parameters for uplink (UL) transmissions utilizing multiple antennas, the method comprising:
   transmitting data over at least two antennas using at least two transmission streams including a first reference channel over a first transmission stream and a second reference channel over a second transmission stream, wherein the first reference channel is precoded with a different set of precoding weights than are used for the second reference channel;
   receiving first feedback for the first reference channel, the first feedback used to determine whether a power level of the first reference channel should be increased or decreased; and
   adjusting a power level of the at least two transmission streams based on the first feedback.

2. The method of claim 1, wherein adjusting the power level of the at least two transmission streams comprises determining a first control gain factor and a second control gain factor based on the first feedback, adjusting the power level of the first transmission stream based on the first control gain factor, and adjusting the power level of the second transmission stream based on the second control gain factor.

3. The method of claim 2, where in the first control gain factor and the second control gain factor are the same.

4. The method of claim 2, further comprising receiving a power offset.

5. The method of claim 4, wherein the power offset is a difference of a Signal-to-Interference Ratio (SIR) of the first reference channel and a SIR of the second reference channel.

6. The method of claim 4, further comprising determining a transmission parameter associated with the second transmission stream based on the power offset.

7. The method of claim 4, wherein the power offset is received via layer 1 signaling.

8. The method of claim 4, further comprising:
   determining a number of bits on the second transmission stream based on a power reference and the power offset.

9. The method of claim 4, further comprising determining a serving grant associated with the second transmission stream based on the power offset.

10. The method of claim 4, further comprising determining a gain offset for the second transmission stream based on the power offset.

11. The method of claim 4, further comprising determining a transport block size for the first transmission stream based on the gain factor for the first transmission stream and determining a transport block size for the second transmission stream based on the power offset.

12. The method of claim 8, wherein the power reference is a transmission power of the first reference channel.

13. The method of claim 9, wherein the serving grant is determined by $$\left\lfloor K_{e,ref,m} \cdot \frac{SG'}{L_{e,ref,m} \cdot A_{ed,m}^2 \cdot 10^{\Delta harq/10}} \right\rfloor.$$

14. A Wireless Transmit/Receive Unit (WTRU) comprising:
   at least two antennas;
   a processor configured to:
   transmit data over at least two antennas using at least two transmission streams including a first reference channel over a first transmission stream and a second reference channel over a second transmission stream, wherein the first reference chancel is precoded with a different set of precoding weights than are used for the second reference channel;
   receive first feedback for the first reference channel, wherein the first feedback is utilized to determine whether a power level of the first reference channel should be increased or decreased; and adjust a power level of the at least two transmission streams based on the first feedback.

15. The WTRU of claim 14, wherein adjusting the power level of the at least two transmission streams comprises determining a first control gain factor and a second control gain factor based on the first feedback, adjusting the power level of the first transmission stream based on the first control gain factor, and adjusting the power level of the second transmission stream based on the second control gain factor.

16. The WTRU of claim 15, wherein the first control gain factor and the second control gain factor are the same.

17. The WTRU of claim 14, wherein the processor is further configured to receive a power offset.

18. The WTRU of claim 17, wherein the power offset is a difference of a Signal-to-Interference Ratio (SIR) of the first reference channel and a SIR of the second reference channel.

19. The WTRU of claim 17, wherein the processor is further configured to determine a transmission parameter associated with the second transmission stream based on the power offset.

20. The WTRU of claim 17, wherein the processor is further configured to determine a number of bits on the second transmission stream based on a power reference and the power offset.

21. The WTRU of claim 17, wherein the processor is further configured to receive the first power offset via layer 1 signaling.

22. The WTRU of claim 17, wherein the processor is further configured to determine a transport block size for the first transmission stream based on a serving grant and determine a transport block size for the second transmission stream based on a first gain factor reference and the power offset.

23. The WTRU of claim 22, wherein the serving grant is determined by $$\left\lfloor K_{e,ref,m} \cdot \frac{SG'}{L_{e,ref,m} \cdot A_{ed,m}^2 \cdot 10^{\Delta harq/10}} \right\rfloor.$$

24. The WTRU of claim 17, wherein the power reference is a transmission power of the first reference channel.

25. A method comprising:
transmitting data on a first reference channel, the data transmitted on the first reference channel precoded by a first set of precoding weights and associated with a first transmission stream;
transmitting data on a second reference channel, the data transmitted on the second reference channel precoded by a second set of precoding weights and associated with a second transmission stream;
receiving feedback associated with the first reference channel, the feedback indicating whether a power level of the first reference channel should be increased or decreased;
receiving a quality metric, the quality metric indicating a characteristic of the second transmission stream; and
determining a gain factor for the second reference channel based on the feedback.

26. The method of claim 25, wherein the characteristic of the second transmission stream is a power level of the second reference channel.

27. The method of claim 25, wherein the characteristic of the second transmission stream is a power level of the second transmission stream.

28. The method of claim 25, wherein the quality metric is a power offset and the power offset is a difference of a Signal-to-Interference ratio (SIR) of the first reference channel and a SIR of the second reference channel.

29. The method of claim 28, wherein the power offset is received via layer 1 signaling.

30. The method of claim 25, further comprising determining a gain factor for of a third channel based on the gain factor of the second reference channel, wherein the third channel is precoded using the second set of precoding weights.

31. The method of claim 25, further comprising:
determining a number of bits on the second transmission stream based on the quality metric.

* * * * *